US007664670B1

(12) United States Patent
Weiss

(10) Patent No.: US 7,664,670 B1
(45) Date of Patent: Feb. 16, 2010

(54) PRODUCT DEVELOPMENT AND ASSESSMENT SYSTEM

(75) Inventor: Lawrence D. Weiss, New York, NY (US)

(73) Assignee: LD Weiss, Inc., New York, NY (US)

( * ) Notice: Subject to any disclaimer, the term of this patent is extended or adjusted under 35 U.S.C. 154(b) by 964 days.

(21) Appl. No.: 10/823,584

(22) Filed: Apr. 14, 2004

Related U.S. Application Data

(60) Provisional application No. 60/462,800, filed on Apr. 14, 2003, provisional application No. 60/463,699, filed on Apr. 17, 2003, provisional application No. 60/515,962, filed on Oct. 31, 2003.

(51) Int. Cl.
*G06F 17/30* (2006.01)
(52) U.S. Cl. .......................................... 705/10; 705/500
(58) Field of Classification Search ...................... 705/1, 705/10
See application file for complete search history.

(56) References Cited

U.S. PATENT DOCUMENTS

| | | | |
|---|---|---|---|
| 4,863,384 | A | 9/1989 | Slade |
| 5,297,250 | A | 3/1994 | Leroy et al. |
| 6,029,195 | A * | 2/2000 | Herz .......................... 725/116 |
| 6,175,833 | B1 | 1/2001 | West et al. |
| 6,189,029 | B1 | 2/2001 | Fuerst |
| 6,311,190 | B1 | 10/2001 | Bayer et al. |
| 6,477,504 | B1 | 11/2002 | Hamlin et al. |
| 6,581,071 | B1 | 6/2003 | Gustman et al. |
| 6,618,746 | B2 | 9/2003 | Desai et al. |
| 2002/0016731 | A1 | 2/2002 | Kupersmit |
| 2002/0152110 | A1* | 10/2002 | Stewart et al. ................. 705/10 |
| 2002/0161664 | A1* | 10/2002 | Shaya et al. ................... 705/26 |
| 2003/0167197 | A1 | 9/2003 | Shoemaker et al. |
| 2005/0010543 | A1* | 1/2005 | Lukomnik et al. ............ 706/46 |

OTHER PUBLICATIONS

Spenke et al., "FOCUS: The Interactive Table for Product Comparison and Selection," *Proceedings of the ACM Symposium on User Interface Software and Technology*, Seattle, Washington, USA, Nov. 6-8, 1996, pp. 41-50.
Globalscape, http://www.globalscape.com/websurvey/features.asp, Oct. 17, 2003, 2 pages.

(Continued)

*Primary Examiner*—Romain Jeanty
*Assistant Examiner*—Mark A Fleischer
(74) *Attorney, Agent, or Firm*—Foley & Lardner LLP

(57) ABSTRACT

The present invention discloses a method, program product and system for conducting product assessment and development. One preferred embodiment relates to a concept and product development technique. An exemplary system and method relates to a web-based survey technique that facilitates developing and testing new products, business investments, and value propositions, as well as testing existing products, businesses, and value propositions. This technique includes systematic solicitation of potential customers or other targeted respondents, eliciting data from customers, automatic processing, interpretation, and scoring of the data, and automatic report generation. The disclosed technique advantageously makes use of continuous metric scales to enable respondents to rate new or existing products. Using an on-line system, this embodiment of the invention provides a fast, engaging, and inexpensive way to gauge customer acceptance and use.

33 Claims, 31 Drawing Sheets

OTHER PUBLICATIONS

Raosoft, http://www.raosoft.com/products/ezsurvey/screenshots.html, Oct. 17, 2003, 2 pages.

Razza Software, http://www.razza.com/products/ultimatesurvey/highlights.asp, Oct. 17, 2003, 5 pages.

Objectplanet, http://www.objectplanet.com/surveyor, Oct. 15, 2003, 3 pages.

ClassApps, http://www.classapps.com/SelectSurveyASPFeatures.asp, Oct. 17, 2003, 6 pages.

SurveySolutions$^{SM}$, http://www.perseusdevelopment.com/softwareprod/index.html, Oct. 17, 2003, 7 pages.

SNAP, http://www.mercator.co.uk/software/softwareprof.shtml, Oct. 17, 2003, 6 pages.

WebSurveyor, http://www.websurveyor.com/survey-software-features.asp., Oct. 17, 2003, 6 pages.

* cited by examiner

Are you the person who pays the bills in your household?
| I pay many of the bills |  |
About how many bills does your household pay per month?
| 9 |  |
How do you usually handle your bills?
| bills come in the mail and I pay most by mailing a check |  |
if "other" please write in [　　　　　　]
You sometimes also
| pay on-line |  |
if "other" please write in [　　　　　　]
Continue
FIG. 3

Usually, bills come in the mail and I pay most by mailing a check. Considering everything this how would you rate it?
Please click on the line below to indicate your rating.

You sometimes also pay on-line. Considering everything about this how do you rate ?
Please click on the line below to indicate your rating.

<u>Click here</u> to see the concept.

*This is an example of how the concept might work. It is only a concept at this point. Please glance at it to get a general idea, then continue the survey.*

Experience 922

Here is how it works:
1. A bill is sent by your biller to the web site behind your bank's firewall and you are notified via email or instant message. It's your choice.
2. You click on the link in the email and log on to your private web site.
3. The web site will allow you to do the following:

- View your current bills/statements and all their detail
- Pay a bill
- Print a bill or statement
- Dispute a bill, or a single charge by clicking on a link that leads you directly to the billers' customer support staff
- View your payment history
- View past bills and statements 4. You click the "pay" button to pay the bill with a credit card, or through any checking account. Of course, you can also print the bill and pop it in the mail.

Here is an example. Please take a quick look at a few sample screen shots to get an idea of how it might work with your bank, then return to the survey.

BANK A

I am interested in...

CHECKING ACCOUNT

Account: Checking - #2293029930

SUMMARY OF ACCOUNTS

Checking Account: 2293029930   Available Balance: $

ACCOUNT DETAIL

 Welcome to Your Private Bill Mailbox!
Hello, Jane! You have 3 new bills.

ACCOUNT SUMMARY

| From: | Date Received: | Status: | What would you like to do? |
|---|---|---|---|
| Connecticut Light & Power | 1/26/2003 5:34a.m. | Sealed | Open Delete File History |
| Allstate Insurance Co. | 1/26/2003 9:47p.m. | Sealed | Open Delete File History |
| Cablevision | 1/25/2003 5:34a.m. | Opened | Open Delete File History |
| Verizon Wireless | —:— | Paid Conf.#1938218311 | Open Delete File History |
| SBC/SNET | —:— | Payment Sent Track my payment | Open Delete File History |
| Principle Mortgage Co. | —:— | Paid Conf.#1938218311 | Open Delete File History |

ACCOUNT DOWNLOAD

STOP PAYMENT

ORDER CHECKS

TRANSFER FUNDS

PAY BILLS
  Pay a Bill
  See New e-Bills
  See Past e-Bills
  Add/Delete a Biller
  See Payment History

HELP

[Add Biller]  [Delete Biller]  [Edit Preferences]

Click here to continue

FIG. 8

BANK A

Account: -#2293029930    Available Balance: $4,398.08    My Filing Cabinet

Connecticut Light & Power    CL&P Home

Customer Service >>

- Account Summary
- View Your Bill
- Bill History
- Pay Your Bill
- Start or Stop Service
- Update Your Accounts
- Contact Us
- Logoff

Account Summary (View Bill History) (View Payment History)

Customer Alert!
Your next bill will not be an estimate. You may see an increase in the amount of your bill.

Account:

| Customer Name | Acct. Balance | Payment Due | Last Payment | Payment Date |
|---|---|---|---|---|
| JANE JOHNSON<br>223 SMITHVILLE LANE<br>AMES, IA 05391-9930 | $75.68 | $75.68 | $57.63 | 1/08/03 |

View a Copy of This Bill

JANUARY BILL INSERTS:
- Notice To All Customers
- EnergySaver Newsletter
- Special Offers from WalMart.com Go to Connecticut Light & Power

What would you like to do?
- Make a payment
- Save this bill and remind me later
- File this bill
- See bill details
- Delete this bill About Your Bill | Pay Your Bill | Start or Stop Service | Disclaimer
CL&P Home | Contact Us

FIG. 11

Now that you know more about the idea, how do you rate it - higher or lower?

Here is how you rated overall.
Click here for a few more questions.

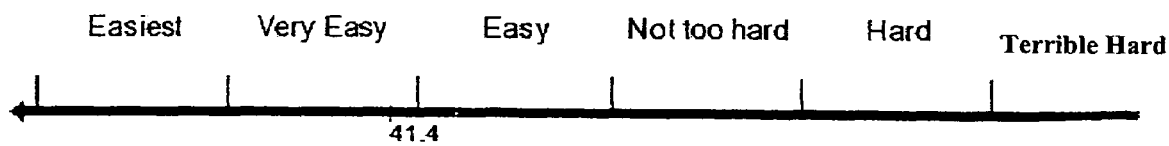
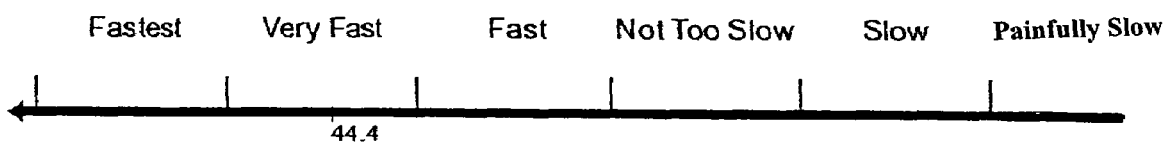
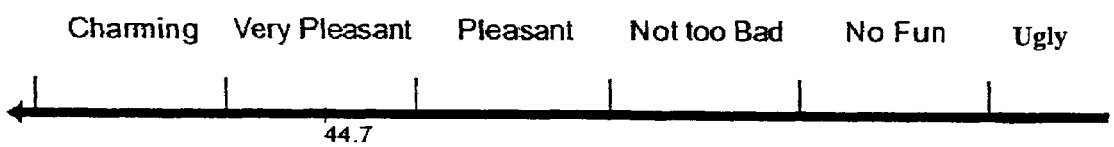
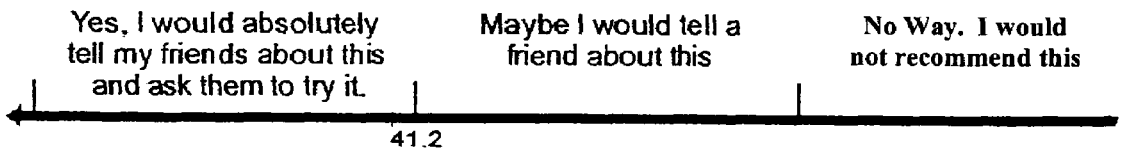
FIG. 13

Thanks for taking the survey.
Your personal rating for the
concept was: 750

Here are the scores and their values:

| | |
|---|---|
| 200 to 300 | Forget about it |
| 301 to 400 | Not ready for prime time |
| 401 to 500 | Something here, but it needs work |
| 501 to 600 | Good concept, works pretty well |
| 601 to 700 | Very strong idea, great execution |
| 701 to 800 | I'm wild for it |

Would you change that score?
    About right
    Raise it
    Lower it

What's the main reason you rated as you did?

[                                    ]

Which most contributed to your rating?
(Please check the main reasons for your rating - no more than 5, please.)

- ☐ good control
- ☐ too technical, complicated
- ☐ easy
- ☐ good privacy
- ☐ I believe this can work successfully
- ☐ good price
- ☐ I like to try new things
- ☐ concern about security
- ☐ just a good idea
- ☐ very convenient
- ☐ concerns about privacy
- ☐ good proof of payment
- ☐ I don't like to be the first to try something new
- ☐ poor record keeping
- ☐ This is important to me
- ☐ good for record keeping
- ☐ concern about proof of payment
- ☐ good organization
- ☐ This is unique
- ☐ concern about organization
- ☐ too expensive
- ☐ good security
- ☐ just not interested
- ☐ I don't believe this can work

FIG.14

Information about yourself

Now if you don't mind, could you also tell us a little bit about yourself for statistical reasons.

Are you a man or woman?   ○ Male   ○ Female

What is your age?   [please pick one ▼]

What is your ZIP code?   [          ]

What is your household income?   [pick one ▼]

If you would like the opportunity to take part in other surveys from time to time, let us know.

⦿ Let me know about other surveys from time to time.
○ Let me know about other surveys, but not more than once or twice a year.
○ Please take me off the list of panelists Please confirm your e-mail address [                    ]

We're glad you enjoyed the survey. If you don't mind we'd like to ask you a few more questions. This will only take a couple of minutes.

⦿ Continue survey
○ No thanks

[Submit]

FIG. 15

I-CAT

The Interactive Customer Acceptance Test
LD Weiss Inc. I-CAT report on Online Bill Payment, March 3, 2003
*Summary report*

Concept 922

Secure and Organized Bill Handling

Finally, an easy way to take the drudgery out of getting your bills paid on time. With this new service you can get your utility bills, credit card bills, telephone, Internet ISP, Cable, student loan bills, insurance – even mortgage or rent – right on the web! You'll get an email as soon as any bill or invoice is ready for viewing. Then you go to your private web site located behind your bank's security firewall. Since you can set up reminders and alerts to notify you anyway you like (email, instant messenger, even a text message sent to your cell phone!), you won't have to worry about missing a payment or a due date ever again. Although you can access all your relevant bills and documents in one easy place, each bill is coming directly from your biller. No one else, including your bank, can see or access the information.

You simply log on to your personalized web site and you can:

- View all the details of your bills and statements.
- Pay bills electronically right from any bank account or charge them to a credit card
- Store these bills and documents online for future reference
- Print bills and statements for your paper files
- View a complete organized payment history and archive.
- Share a specific bill or statement with someone else - for example, share the tuition bill with your parents.

This service will present and archive the following bills and statements to make your life a little more manageable.

- Utility bills (phone, electric, cable, etc.)
- Rent or mortgage
- Car Loan bills
- Credit Card bills
- Insurance bills
- Medical bills
- Tuition bills
- School Housing, Meal Plan, Student Health,

FIG. 16

I-CAT Scores

Bookstore bills
- and practically any other bill from any business or institution Experience 922

Here is how it works:
1. A bill is sent by your biller to the web site behind your bank's firewall and you are notified via email or instant message. It's your choice.
2. You click on the link in the email and log on to your private web site.
3. The web site will allow you to do the following:

- View your current bills/statements and all their detail
- Pay a bill
- Print a bill or statement
- Dispute a bill, or a single charge by clicking on a link that leads you directly to the billers' customer support staff
- View your payment history
- View past bills and statements 4. You click the "pay" button to pay the bill with a credit card, or through any checking account. Of course, you can also print the bill and pop it in the mail.

Here is an example. Please take a quick look at a few sample screen shots to get an idea of how it might work with your bank, then return to the survey.

Here are possible I-CAT scores and their values:

| | |
|---|---|
| 200 to 300 | Forget about it |
| 301 to 400 | Not ready for prime time |
| 401 to 500 | Something here, but it needs work |
| 501 to 600 | Good concept, works pretty well |
| 601 to 700 | Very strong idea, great execution |
| 701 to 800 | Customers are wild for it |

Summary Report on Online Bill Payment.
Sample: Internet Enabled U.S. population 18-65 years old

Table 1. I-CAT Score (Total N=88)
Table 1 shows the calculated i-CAT scores of the concept among total users. Column 1 is the I-CAT score. Column 2 shows percent of the time the concept was preferred to the Favorite. Column 3 shows percent of time the concept was

FIG.17

I-CAT Scores preferred to the Next favorite. Column 4 shows the percentage of times the experience was preferred to the concept. Columns 5 through 8 are the ratings on the diagnostic scales.

| | I-CAT score | Concept beats Favorite | Concept beats Next favorite | Experience beats concept | Easy | Fast | Charming | Recommends to friend |
|---|---|---|---|---|---|---|---|---|
| Max score possible | 800 | % | % | % | 60 | 60 | 60 | 100 |
| 922 Total | 552 | 48.9 | 53.4 | 76.1 | 46.1 | 45.9 | 44.8 | 66.9 |

Table 2. The concept was preferred to the Favorite by 49% of the sample (N = 88). The concept was preferred to the Next favorite by 53% of the sample. 76% of the respondents preferred the product over the promise of the concept. The product delivers on the promise. Preference for the top item is shown over the items below it.

| % | Concept % wins over | Experience % wins over | Favorite % wins over | Next favorite % wins over |
|---|---|---|---|---|
| Concept | X | 76 | 51 | 47 |
| Experience | 24 | X | 43 | 33 |
| Favorite | 49 | 57 | X | 45 |
| Next favorite | 53 | 67 | 55 | X |
| Average % | 42 | 67 | 50 | 42 |

Table 3. I-CAT Score Segments. Table 3 shows the percentage of the sample who scored the concept in each I-CAT range. Scores over 600 and between 501 and 600 are both very strong scores.

| | | Total I-CAT Score | 601 - 800 | 501 - 600 | 401 - 500 | 200 - 400 |
|---|---|---|---|---|---|---|
| | | | % | % | % | % |
| 922 Total | n=88 | 552 | 49 | 8 | 19 | 24 |

Table 3A. Percent who answered the listed questions, by top score segments.

| | | Total sample | 501 - 800 | 601 - 800 | 501 - 600 |
|---|---|---|---|---|---|
| | | | % | % | % |
| 922 Total | N=88 | 100% | 50/88 = 57% | 43/88 = 49% | 7/88 = 8% |
| If acceptable alternatives exist, and all other things were equal, would you change suppliers to get your bills presented the new way? | | | | | |

FIG. 18

I-CAT Scores

| Wouldn't switch | n=34 | 39% | 16/50 = 32% | 12/43 = 28% | 4/7 = 57% |
| --- | --- | --- | --- | --- | --- |
| Would switch | n=48 | 55% | 32/50 = 64% | 30/43 = 70% | 2/7 = 29% |
| Will you be satisfied with electronic confirmation of bill payment, or do you also need a paper confirmation to come in the mail? | | | | | |
| Need paper | n=27 | 31% | 9/50 = 18% | 8/43 = 19% | 1/7 = 14% |
| Electronic OK | n=55 | 62% | 39/50 = 78% | 34/43 = 79% | 5/7 = 71% |
| I make a point of paying my entire credit card balance every month | | | | | |
| No | n=57 | 65% | 35/50 = 70% | 30/43 = 70% | 5/7 = 71% |
| Yes | n=24 | 27% | 12/50 = 24% | 11/43 = 26% | 1/7 = 14% |

Table 3B. Shows percent of sample who scored the concept over their favorite by demographics.

| | Total | | Concept preferred | | Concept not preferred | |
| --- | --- | --- | --- | --- | --- | --- |
| 922 Total | N=88 | 552 | 49% | 701 | 51% | 409 |
| Avg. age | 42 | | 40 | | 44 | |
| Avg. income | $50,027 | | $53,836 | | $46,388 | |
| % Male/female | 28 / 72 | | 23 / 77 | | 33 / 67 | |

Table 4. I-CAT Score Segments by Demographics.

| | Total | 601 - 800 | 501 - 600 | 401 - 500 | 200 - 400 |
| --- | --- | --- | --- | --- | --- |
| 922 concept | n=88 | 49 | 8 | 19 | 24 |
| Avg. score | 551 | 723 | 547 | 456 | 278 |
| Avg. age | 42 | 40 | 44 | 43 | 44 |
| % Male/female | 28 / 72 | 23 / 77 | 57 / 43 | 41 / 59 | 19 / 81 |
| Avg. income | $50,027 | $57,150 | $60,356 | $42,940 | $37,737 |

Table 5. Top two reasons for I-CAT score

| | 601-800 | 501-600 |
| --- | --- | --- |
| 922 Total | very convenient; good for record keeping | very convenient; concern about security |

FIG. 19

I-CAT Scores

Table 5A. All reasons ranked by frequency.

| Reason | % chosen |
|---|---|
| very convenient | 40 |
| I believe this can work successfully | 32 |
| good for record keeping | 27 |
| concerns about privacy | 26 |
| concern about security | 24 |
| good proof of payment | 17 |
| just a good idea | 14 |
| easy | 12 |
| good organization | 12 |
| concern about proof of payment | 11 |
| good security | 9 |
| just not interested | 9 |
| too expensive | 7 |
| good privacy | 7 |
| This is unique | 6 |
| pleasant | 6 |
| concern about organization | 5 |
| I like to try new things | 3 |
| This is important to me | 3 |
| I don't like to be the first to try something new | 2 |
| I don't believe this can work | 1 |

Table 6. Regional distribution. Shows percent who scored from 601-800 by geographical regions, for users who provided region information.

|  | National | Northeast | Southeast | Midwest | West |
|---|---|---|---|---|---|
| Total | n=69 | 40% | 44% | 57% | 88% |

Table 6A. Attitudes towards bills

FIG. 20

I-CAT Scores

| n=82 | Agree | Disagree |
|---|---|---|
| I feel comfortable having my bills presented behind my bank's firewall. | 67 | 33 |
| I would use this service for recurring payments, that is, payment that are the same every month. | 73 | 26 |
| This payment system assures my privacy. | 52 | 48 |
| I would use this system for almost all my bills. | 56 | 43 |
| It is a convenience to have the option of paying bills with my credit card. | 65 | 35 |
| This is a secure payment system. | 51 | 46 |
| This is particularly good for utilities, such as Cable TV, Electric and Telephone. | 73 | 27 |
| My bank is the right place to have my bills presented by my billers | 66 | 34 |

Table 6A. Top two. Shows percent of users who rated concepts in highest two categories.

|  | Concept | Experience | Favorite | Next favorite |
|---|---|---|---|---|
| % top two | 57% | 69% | 56% | 53% |

Table 7. The payment methods were:

| payment method | Favorite % | Next favorite % | 922 beats favorite/next favorite % | % |
|---|---|---|---|---|
| bills come in the mail and I pay most by mailing a check | 74 | * | 49 | - |
| pay in person | * | 24 | - | 52 |
| pay on-line | * | 18 | - | 75 |
| bills come in the mail and I pay most on-line | 17 | * | 53 | - |
| have it debited to your checking account | * | 15 | - | 31 |
| send a check | * | 14 | - | 58 |
| use a coupon book and mail payments | * | 8 | - | 57 |
| have it charged to your credit card | * | 7 | - | 50 |
| pay by telephone | * | 7 | - | 67 |
| just write a check | * | 6 | - | 40 |
| bills come in the mail and I pay some | | | | |

FIG. 21

I-CAT Scores

| | | | | |
|---|---|---|---|---|
| by cash or check in person | 6 | * | 60 | - |
| pay in cash | * | 2 | - | * |
| and on phone/online | 1 | * | * | - |
| bills go to my credit card and I pay the credit card on-line | 1 | * | * | - |
| bills go to my credit card and I pay that by a mailing a check | 1 | * | * | - |

What users had to say:

Online Bill Payment

I rather pay online than use a stamp and snail mail. Rather have bills paid quickly and have this option when need to pay by due date.

Bill payer is: from Weidman, MI, F, 37 years old, earns under $15,000, rated 800, because I believe this can work successfully, good organization, just a good idea, very convenient, agrees with rating

---

I love to pay bills online because it gives me more time to have the money instead of sending it thru snail mail Bill payer is: from Saint Petersburg, FL, F, 43 years old, earns $25,000 - $29,999, rated 800, because good for record keeping, I believe this can work successfully, very convenient, good proof of payment, agrees with rating

---

I don't want to miss deadlines on bills

Bill payer is: from Highland, NY, F, 48 years old, earns $90,000 - $94,999, rated 800, because good for record keeping, I believe this can work successfully, concern about proof of payment, This is unique, very convenient, agrees with rating

---

The ease of it.

Bill payer is: from Deltona, FL, M, 54 years old, earns $80,000 - $84,999, rated 800, because good for record keeping, I believe this can work successfully, good organization, This is unique, concern about security, very convenient, concerns about privacy, wants lower rating

---

EASE IN USE AND CURRENT INFORMATION BASE.

Bill payer is: from Aurora, CO, F, 54 years old, earns $65,000 - $69,999, rated 800, because good privacy, good for record keeping, good organization, very convenient, agrees with rating

--- conveinance of concept for busy people

Bill payer is: from Antigo, WI, F, 32 years old, earns $50,000 - $54,999, rated 800, because easy, I believe this can work successfully, very convenient, agrees with rating

---

Ease of use. Can make payments on time. And don't have to keep all the old bills to ensure that the payment was recored correctly.

Bill payer is: F, 47 years old, earns $75,000 - $79,999, rated 800, because easy, good for record keeping, very convenient, good proof of payment, agrees with rating

--- ease of use

FIG. 22

I-CAT Scores

Bill payer is: from Tucson, AZ, F, 23 years old, earns $15,000 - $19,999, rated 783, because easy, This is important to me, good privacy, good for record keeping, I believe this can work successfully, good organization, very convenient, good security, good proof of payment, agrees with rating Simple, easy to use and easier than dealing with a stack of papers. Also better than mail because you have to guess the mail time for the payment to arrive on time.

Bill payer is: from San Leandro, CA, F, 34 years old, earns $50,000 - $54,999, rated 783, because easy, good for record keeping, good organization, very convenient, agrees with rating Convenience and organization Bill payer is: from Gloucester, MA, F, 34 years old, earns $40,000 - $44,999, rated 783, because good for record keeping, very convenient, agrees with rating It is very convenient,and I already have accounts with Chase and trust them to keep it secure Bill payer is: F, 47 years old, earns $55,000 - $59,999, rated 783, because very convenient, good security, agrees with rating Always a concern about errors and security but it looks very convenient Bill payer is: F, 38 years old, earns $95,000 - $99,999, rated 783, because good for record keeping, concern about security, very convenient, wants lower rating All in one place, no lost or late bills. Being able to pay bills at any time of day or night. Able to see the whole picture instead of just the one statement.

Bill payer is: from Malden, MO, F, 49 years old, earns $100,000 - $109,999, rated 767, because good privacy, good for record keeping, very convenient, good proof of payment, agrees with rating Bill payer is: from Council Bluffs, IA, M, 32 years old, earns $100,000 - $109,999, rated 767, agrees with rating Stamps get expensive, and it would be so easy to just "click".

Bill payer is: from Buffalo, NY, F, 46 years old, earns $40,000 - $44,999, rated 767, because good for record keeping, I believe this can work successfully, concern about proof of payment, very convenient, agrees with rating I liked most every thing about it the only thing I would look into more is the safty of the account.

Bill payer is: from Shiloh, GA, M, 34 years old, earns $45,000 - $49,999, rated 750, because I believe this can work successfully, just a good idea, agrees with rating I find myself more and more using on;line services for payments becauuse of ease and account availabilty Bill payer is: from Raytown, MO, M, 60 years old, earns $65,000 - $69,999, rated 750, because easy, I believe this can work successfully, agrees with rating I think it's a great idea.

Bill payer is: from East Cleveland, OH, F, 29 years old, earns $30,000 - $34,999, rated 750, because I believe this can work successfully, very convenient, agrees with rating

FIG. 23

I-CAT Scores

Because sometimes the mail takes a while to get to me. And then I am late paying the bill.

Bill payer is: from Delanson, NY, F, 42 years old, earns $35,000 - $39,999, rated 750, because I don't like to be the first to try something new, good for record keeping, just a good idea, very convenient, good proof of payment, agrees with rating

---

Excellent concept which I like extremely well Rate at 690

Bill payer is: F, 53 years old, earns $45,000 - $49,999, rated 750, because easy, This is important to me, good for record keeping, I believe this can work successfully, very convenient, good proof of payment, wants lower rating

---

I rated as I di because I thing it it a wonderful concept. I would not have to worry about my payments being late.

Bill payer is: F, 28 years old, earns $30,000 - $34,999, rated 733, because I believe this can work successfully, very convenient, agrees with rating

---

Bill payer is: from Vacaville, CA, F, 49 years old, earns $70,000 - $74,999, rated 717, because good privacy, good for record keeping, I believe this can work successfully, agrees with rating

---

I currently use Quicken Bill Pay which has a similar concept. It would be great to have links from one single bill pay site to all of my bills. Currently, not all of my accounts can be viewed in this way. In some cases, I have to log out of Quicken Bill Pay to go to the account to view the bill, ask questions, etc.

Bill payer is: from Tulsa, OK, F, 41 years old, earns $80,000 - $84,999, rated 717, because good privacy, I believe this can work successfully, very convenient, good proof of payment, agrees with rating

---

Seems very easy and organized.

Bill payer is: from Modesto, CA, F, 29 years old, earns $50,000 - $54,999, rated 717, agrees with rating

--- the ease f it all. i for one wish i cold pay all my bills online on the same day one after the other in the same order so as not to miss any. as it is now there are only so many that offer this service and most try to force you into automatic withdrawal and i do not want that. i still want the control of seeing the bill and actually paying it regularly Bill payer is: from Melbourne, FL, F, 47 years old, earns $65,000 - $69,999, rated 717, because good for record keeping, I believe this can work successfully, good organization, just a good idea, agrees with rating

---

It is still questionable for security reason

Bill payer is: from Dalzell, SC, F, 47 years old, earns $40,000 - $44,999, rated 717, because good organization, This is unique, just a good idea, wants lower rating

--- ease of use..never saw the price..unless free probably would not use as i do not have many bills Bill payer is: F, 36 years old, earns $120,000 - $129,999, rated 717, because good security, pleasant, wants lower rating

---

Looks very interesting, but until I have tried it I would not be completely sure this was for me.

Bill payer is: from Littleton, IL, F, 43 years old, earns $45,000 - $49,999, rated 700, because concern about proof of payment, very convenient, agrees with rating

FIG. 24

I-CAT Scores

Bill payer is: from Sherman, TX, F, 18 years old, earns under $15,000, rated 667, because good for record keeping, good organization, very convenient, good proof of payment, pleasant, agrees with rating It's a great concept, but security is a very big concern Bill payer is: from Rittman, OH, M, 44 years old, earns $25,000 - $29,999, rated 667, because I don't like to be the first to try something new, very convenient, concerns about privacy, just not interested, agrees with rating quick easy way to pay bills Bill payer is: from Kannapolis, NC, F, 44 years old, earns $60,000 - $64,999, rated 667, because easy, good privacy, good for record keeping, too expensive, agrees with rating It's nice to have new ways to make life a little easier. Not having to run all over town and to be able to pay all the bills in one place is a nice idea. Also, it's nice to have up to date information on your account, and to be able to see the bill history, instead of having to wait for the mail to come with the information and to keep all sorts of paper records at home with you.

Bill payer is: from Evansville, IN, M, 24 years old, earns $60,000 - $64,999, rated 667, because I believe this can work successfully, good organization, I like to try new things, very convenient, agrees with rating good idea, looks easy to use Bill payer is: from Elkton, MD, M, 44 years old, earns $100,000 - $109,999, rated 667, because I believe this can work successfully, agrees with rating there are times with online bill payment where a bill has been deducted two to three times which overdraws the account and I have had problems with the companies righting the worng. Overall I love the convience until this happens.

Bill payer is: from Calumet City, IL, F, 38 years old, earns $40,000 - $44,999, rated 667, because good for record keeping, I believe this can work successfully, good security, good proof of payment, agrees with rating time efficiency Bill payer is: from Bryan, TX, F, 46 years old, earns $55,000 - $59,999, rated 667, agrees with rating I gave it a high rating because it seems like a good idea; however, paying by internet can be risky. My son paid a bill over the internet and the company kept taking payments out of his checking account. It took time to get the money put back in.

Bill payer is: from Tucumcari, NM, F, 47 years old, earns $75,000 - $79,999, rated 650, because good for record keeping, concern about proof of payment, This is unique, concern about security, very convenient, pleasant, agrees with rating Bill payer is: from Topeka, KS, F, 51 years old, earns $25,000 - $29,999, rated 650, because good proof of payment, agrees with rating Bill payer is: from Mahwah, NJ, F, 45 years old, earns $50,000 - $54,999, rated 650, because easy, good for record keeping, agrees with rating showing what the concept looks like on someone's computer made all the difference Bill payer is: from Los Angeles, CA, M, 34 years old, earns $50,000 - $54,999, rated 650, because very

FIG. 25

I-CAT Scores convenient, agrees with rating

Bill payer is: F, 39 years old, earns $175,000 - $200,000, rated 650, because good for record keeping, concern about proof of payment, concern about security, very convenient, wants lower rating because i like to try new and different things that are going to make my life easier Bill payer is: from Jackson, MI, F, 30 years old, earns $40,000 - $44,999, rated 633, because good for record keeping, I believe this can work successfully, I like to try new things, agrees with rating for the convience Bill payer is: from Crete, IL, M, 41 years old, earns $30,000 - $34,999, rated 633, because concern about organization, good proof of payment, agrees with rating I like the security Bill payer is: from Raleigh, NC, M, 44 years old, earns $75,000 - $79,999, rated 617, because This is unique, just a good idea, good security, agrees with rating I like it, I think its great, but I would be very cautious to use it.

Bill payer is: from Mc Connellsburg, PA, F, 35 years old, earns $25,000 - $29,999, rated 583, because concern about security, very convenient, concerns about privacy, agrees with rating it takes away from the flow of cash, and the likelyhood of things not getting paid, or lost. It also elimates the theft and less cash flow..

Bill payer is: from Chesterfield, MI, M, 39 years old, earns $50,000 - $54,999, rated 567, because I believe this can work successfully, just a good idea, very convenient, wants lower rating Too Fast Bill payer is: M, 57 years old, earns $110,000 - $119,999, rated 567, because good for record keeping, I believe this can work successfully, very convenient, good proof of payment, agrees with rating Online Security questions.

Bill payer is: from Oak Island, NC, M, 44 years old, earns $35,000 - $39,999, rated 550, because concerns about privacy, just not interested, agrees with rating Bill payer is: from Oscoda, MI, F, 48 years old, earns $25,000 - $29,999, rated 533, because easy, concern about security, just a good idea, concerns about privacy, agrees with rating It would depend on the availability of the internet to access accounts and there are sometimes problems with service in my area. Last week our service was down for the entire week and therefore this system would not have worked well for me. Most of the time, however, it would be o.k.

Bill payer is: from Tionesta, PA, F, 44 years old, earns $110,000 - $119,999, rated 517, because concern about security, too expensive, very convenient, good proof of payment, agrees with rating Bill payer is: from Ralston, NE, M, 39 years old, earns $45,000 - $49,999, rated 517, agrees with rating There's the issue of cashflow and the transfer of funds that electronic banking does not

FIG. 26

I-CAT Scores seem to be able to address. For example, if I have funds in a credit union and I need to transfer them, to do it electronically, I'll need the cu to be part of a system. Then there's the issue of electronic security – lack of or too much of. And there's the basic issue: Why do I want to change what I'm currently doing if it works fine for me?

Bill payer is: from Wexford, PA, M, 50 years old, earns $100,000 - $109,999, rated 500, agrees with rating

---

I like the concept.

Bill payer is: from Charlotte, NC, F, 45 years old, earns $35,000 - $39,999, rated 500, because I believe this can work successfully, good organization, very convenient, good proof of payment, agrees with rating

---

I am a little scared of on-line paying because of hackers.

Bill payer is: from Saint Petersburg, FL, F, 54 years old, earns $30,000 - $34,999, rated 467, because I believe this can work successfully, concern about security, very convenient, concerns about privacy, wants higher rating

---

The concept is really good, but I am not yet ready to put my entire fanancial resources "on-line".

Bill payer is: from Cushman, MA, F, 48 years old, earns $65,000 - $69,999, rated 467, because I believe this can work successfully, good organization, concern about security, concerns about privacy, wants higher rating

---

I like the idea but I do not trust the security. There is too much fraud on the internet.

Bill payer is: M, 60 years old, earns pick one, rated 467, because concern about security, very convenient, just not interested, agrees with rating

---

There is still a degree of uncertainty in my mind about internet transactions. don't know exactly why- Bill payer is: M, 43 years old, earns $95,000 - $99,999, rated 467, because I believe this can work successfully, very convenient, good security, concerns about privacy, agrees with rating

---

Not real sure about paying on line due to security and the chance of someone else getting into your files.

Bill payer is: F, 35 years old, earns $45,000 - $49,999, rated 467, because concern about security, just a good idea, concerns about privacy, agrees with rating

---

I do not have a problem, per se, with the way I handle things now.

Bill payer is: F, 22 years old, earns under $15,000, rated 467, because I like to try new things, concerns about privacy, wants higher rating

---

Bill payer is: from Queens Village, NY, F, 44 years old, earns $45,000 - $49,999, rated 450, because good for record keeping, I believe this can work successfully, agrees with rating

---

Bill payer is: from Newport, TN, M, 41 years old, earns $30,000 - $34,999, rated 450, because concern about proof of payment, concern about security, too expensive, concerns about privacy, agrees with rating

--- i do not trust internet to pay bills at this time

Bill payer is: from East Meadow, NY, F, 55 years old, earns under $15,000, rated 450, because concerns about privacy, agrees with rating

FIG. 27

I-CAT Scores

I am happy with the way I handle my bills now. However I am sure that this concept would suit others well.

Bill payer is: from Council Bluffs, IA, F, 27 years old, earns $25,000 - $29,999, rated 450, because just a good idea, concerns about privacy, agrees with rating

--- i still think it is safer to receive the bills in the mail and i like to have a choice of how i want to pay my bill (by mail or online)

Bill payer is: F, 27 years old, earns $60,000 - $64,999, rated 450, because concerns about privacy, agrees with rating

---

I could do that allready for 4.95 per mounth through my bank. To set up a deal like this and risk internet theift, a program would not only have to be free but also include totaly free perks so a coustomer could make it worth their chance in a million risk.

Bill payer is: from Woodbridge, IN, M, 50 years old, earns $95,000 - $99,999, rated 433, because concern about security, agrees with rating

--- some times the inter-net is down, or my computer is not working right, Then what would I do?

Bill payer is: M, 46 years old, earns $120,000 - $129,999, rated 433, because concern about proof of payment, concern about security, agrees with rating

---

Bill payer is: M, 31 years old, earns $50,000 - $54,999, rated 433, agrees with rating

---

I'm terrible with money, especially the way my paycheck falls,,,,,

Bill payer is: from Tampa, FL, F, 46 years old, earns $20,000 - $24,999, rated 417, because just not interested, wants higher rating

---

Not everyone uses a computer. I am concerned about security and accuracy.

Bill payer is: F, 49 years old, earns $20,000 - $24,999, rated 400, because concern about security, concern about organization, good security, concerns about privacy, agrees with rating

--- do not like the concept of access to bank account already had number stolen and used for internet porn to the tune of 500.00 could have wiped me out

Bill payer is: from Shively, KY, F, 48 years old, earns $45,000 - $49,999, rated 383, because concerns about privacy, agrees with rating

---

Bill payer is: F, 45 years old, earns $45,000 - $49,999, rated 367, because concerns about privacy, agrees with rating

--- looks like work

Bill payer is: from Eagleville, PA, F, 45 years old, earns pick one, rated 350, because just not interested, agrees with rating

---

I perfer to get copies of things I pay for, for proof later on if there is a problem, so therefore a canceled check, works well in this area. Also people that have used electronic tranfers to pay bills, have also run into the problem of the same bill being paid numerous times, and then you have the hassle of trying to straighten out the matter yourself, with your bank, and that can be time consuming.

FIG. 28

I-CAT Scores

Bill payer is: from Stickney, IL, F, 43 years old, earns $30,000 - $34,999, rated 333, because concern about security, agrees with rating Bill payer is: F, 40 years old, earns $25,000 - $29,999, rated 333, because concern about proof of payment, concern about security, too expensive, concerns about privacy, agrees with rating The way I feel about the concept.

Bill payer is: F, 37 years old, earns $35,000 - $39,999, rated 333, because just not interested, agrees with rating

ALREADY HAVE ONLINE BILL PAYMENT ALL IN PLACE.

Bill payer is: from Phoenix, AZ, M, 46 years old, earns $90,000 - $94,999, rated 317, because easy, just a good idea, pleasant, wants higher rating

I DON'T LIKE CHANGING THINGS.

Bill payer is: from Paden City, WV, F, 46 years old, earns under $15,000, rated 317, agrees with rating I am content with how I pay bills now.

Bill payer is: F, 24 years old, earns pick one, rated 300, because just a good idea, very convenient, good proof of payment, pleasant, wants higher rating I AM VERY LEARY ABOUT PUTTING TOO MUCH OF MY PERSOANL INFORMATION INTO THE COMPUTER, EVEN IF THE SIGHT IS SECURE. I AM READING ALL OF THE TIME ABOUT IDENTITY THEFT AND HACKERS GETTING INTO PEOPLE'S BUSINESS. I FEEL THERE IS A LOT THAT NEEDS TO BE DONE YET FOR THE AVERAGE PERSON TO FEEL MORE SECURE ABOUT THIS TYPE OF SERVICE.

Bill payer is: from Hamlet, IN, F, 46 years old, earns $70,000 - $74,999, rated 283, because concerns about privacy, agrees with rating i like the idea but the thought of viruses and people stealing information online i would not like that available Bill payer is: from Clarksville, MI, F, 40 years old, earns $45,000 - $49,999, rated 283, because easy, I believe this can work successfully, concern about security, concerns about privacy, agrees with rating Bill payer is: from Dillsburg, PA, F, 45 years old, earns $20,000 - $24,999, rated 267, because concern about proof of payment, concern about security, concern about organization, concerns about privacy, agrees with rating Bill payer is: from Chatom, AL, F, 47 years old, earns pick one, rated 267, agrees with rating Because i like to see my money and know where it goes !!!!

Bill payer is: from Raymondville, MO, F, 54 years old, earns under $15,000, rated 250, because This is important to me, I believe this can work successfully, concern about security, concerns about privacy, agrees with rating To much info on line. To many hacker's.

Bill payer is: from Ashtabula, OH, M, 39 years old, earns $75,000 - $79,999, rated 233, agrees with rating

FIG. 29

I-CAT Scores

--- chase overcharges for everything

Bill payer is: M, 51 years old, earns under $15,000, rated 217, because too expensive, good security, just not interested, agrees with rating

---

I don't like to give to much information over the internet.

Bill payer is: from Ozone Park, NY, F, 51 years old, earns $60,000 - $64,999, rated 200, because I don't believe this can work, agrees with rating

---

I don't trust the internet yet.too many things can go wrong.

Bill payer is: from Mentor, OH, F, 44 years old, earns $95,000 - $99,999, rated 200, because concern about proof of payment, concern about security, concern about organization, concerns about privacy, wants lower rating

---

Bill payer is: from Macon, GA, M, 41 years old, earns $70,000 - $74,999, rated 117, because too expensive, just not interested, agrees with rating

--- dont care to pay on line

Bill payer is: from Bishop, TX, F, 53 years old, earns $30,000 - $34,999, rated 100, agrees with rating

PRODUCT DEVELOPMENT AND ASSESSMENT SYSTEM

RELATED APPLICATIONS

This application claims the benefit of priority to the following provisional applications, the respective contents of which are hereby incorporated by reference in their entireties: U.S. Patent Application No. 60/462,800, filed Apr. 14, 2003; U.S. Patent Application No. 60/463,699, filed Apr. 17, 2003; U.S. Patent Application No. 60/515,962, Oct. 31, 2003.

BACKGROUND OF THE INVENTION

A. Field of the Invention

The present invention is directed to a product development and assessment system and method. Specifically the invention is directed to a method, system, and program product for conducting network-based surveys of respondents (such as prospective or existing consumers or customers) using continuous metric scales; developing a framework within which respondents rate new or existing products, services or advertisements; translation of the survey results into a readily understandable score, and automatic interpretation and reporting of the data and score in plain English.

B. Background

Traditionally, product and service development involves evaluation of customer acceptance. During economic slowdowns, companies typically have fewer resources to devote to time and cost intensive customer studies. A rapid, reliable and inexpensive system for getting large scale consumer evaluations of new product concepts, and developing these concepts into full implementation and execution would be desirable.

Furthermore, both venture capitalists and investors capitalized Internet start-ups at historic levels—even though the start-ups often had little marketplace experience, no profits, and no measure of whether customers would adopt their product or service over the long run. The bottom dropped out of this market. Some of the companies were popular, but did not have profit models to sustain them. Other companies failed because customers were dissatisfied with either the product or the execution of the product, i.e., how easy or charming was the experience of doing business on-line. One factor leading to the funding debacle was that venture capitalists did not have the tools to assess whether consumers would try, like, and adopt the new electronic product or service. The new companies focused their capital on building expensive systems, databases, communications systems, applications and even factories and advertising before they knew whether customers really wanted the product or service as the company planned to deliver it.

Investors typically rely on business plans to determine whether or not to invest. Business plans, however, typically lack a reliable objective indicator of: whether the target customer wants the idea; whether, if consumers try it, it delivers what the idea promises; and whether the customer perceives that the electronic product or service is an effortless, charming experience that works at the customer's speed and is an improvement over the customer's old way of acquiring the product or service.

Today, many companies use focus groups to estimate customer response to new concepts, products, and advertisements. Focus groups can identify issues, anecdotes and customer language. The results, however, are often narrow. Focus group results, moreover, can readily be manipulated by the subjective nature of the questions and the moderator's position on the product, service, or advertisement. Focus groups have their use, but focus groups cannot deliver rigorous quantitative and qualitative evaluation and diagnosis of the concept, product, and advertisement.

Those skilled in the art appreciate that the most reliable indicator of the potential acceptance of a product is "rank order data." Rank order data is a measurement of the customer's view on the relative appeal of the new product concept compared to the customer's current product. Unfortunately, obtaining valid and reliable rank order data is often difficult, costly and time-consuming. It is difficult because there is often no current method of having customers identify their preferences in an objective manner. Even if there were a current way to secure customer's preferences, researchers would require statistically significant samples to be reliable, and it would be time-consuming and expensive to acquire these samples using traditional methods.

SUMMARY OF THE INVENTION

Having identified the aforementioned problems in the existing methods of consumer surveys and product development and assessment, the inventor has developed the present invention. As described in the present application, the invention provides a method, system and program product for conducting network-based surveys of respondents (such as existing or potential consumers or customers, or other targeted respondents) using continuous metric scales and developing a framework within which respondents rate new or existing products. A continuous metric scale can be depicted as a line, preferably one without end points. When a respondent identifies a rating on the continuous line, the rating is recorded as a demarcation on the line.

The present invention discloses a method, program product and system for conducting product assessment and development, where the method comprises displaying on a terminal a predetermined scale against which a respondent can indicate a rating for a first existing product, receiving a first existing product rating indicated against the scale from the terminal of the respondent, displaying a visual indicator along the scale corresponding to the first existing product rating, receiving a first different product rating indicated against the scale from the terminal of the respondent, displaying a visual indicator along the scale corresponding to the first different product rating and collecting ratings made by the respondent via the terminal.

The invention also includes a method of conducting assessment and development of a product using information from a plurality of targeted respondents (such as potential or existing customers or consumers), where the method comprises collecting answers and ratings made by a plurality of respondents using the method described above and generating a product assessment report for the product.

In the present specification, the term "product" is defined broadly to include any method, service, or article of manufacture. The term "product" also includes all of the features and marketing components of any method, service or article of manufacture, including by way of example, but not limited to advertising, marketing plans, brochures, packaging, pricing, positioning, and other components that those skilled in the art would appreciate. Accordingly, the present invention may be used to assess methods, services, articles of manufacture, and their underlying features and marketing components, whether the "product" is pre-existing or new.

The invention described herein solves the problem described above regarding the use of business plans by providing a reliable and readily replicable objective measurement system. The instant invention also solves the problems involved in obtaining valid rank-order data by enabling respondents to identify their views on their current favorites and their view of the relative appeal of the new product all on the same continuous metric line scale. Their current favorites act as a metric anchor. In addition, the use of the web-based survey technique enables the developer to obtain statistically significant samples on a fast and cost effective basis.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The foregoing advantages and features of the invention will become apparent upon reference to the following detailed description and the accompanying drawings, of which:

FIGS. 3, 4A-4C, 5-11, 12A-12B, and 13-15 illustrate various screens displayed to a respondent under a preferred embodiment of the present invention.

FIGS. 16-30 illustrate a report generated under a preferred embodiment of the present invention.

DETAILED DESCRIPTION OF THE INVENTION

Figure 1:
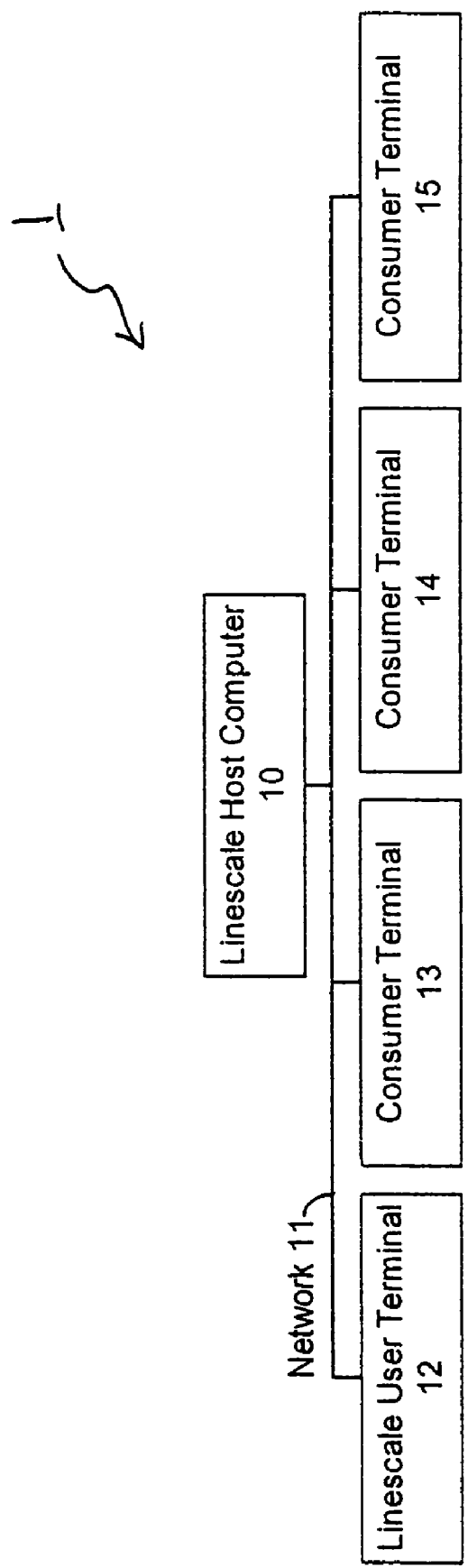
FIG. 1 is a block diagram illustrating a system according to one embodiment of the present invention.

The present invention is now described in detail in reference to certain preferred embodiments of the invention. General features of the invention are first described. Next, particular embodiments are described in reference to the above-mentioned figures.

Generally, the present invention can be summarized as a management information system and method for the development and assessment of products and services. One preferred embodiment described herein is referred to as a Linescale Product Development System. This exemplary system and method relates to a web-based survey technique that facilitates developing and testing new products, business investments, and value propositions, as well as testing existing products, businesses, and value propositions. This technique includes systematic solicitation of respondents, preferably potential customers, eliciting data from respondents, automatic processing, interpretation, and scoring of the data, and automatic report generation. Using an on-line system, this embodiment of the invention provides a fast, engaging, and inexpensive way to gauge customer acceptance and use.

The interactive development tool first guides generation of the concept, then development of the product or service and its marketing components. As explained below, the combination of the two techniques, when used iteratively, provides a unique management information system, method, and program product for product and service development, and business assessment tool.

The invention provides a behavior predictive development tool rather than an attitude measure. The invention enables respondents, including potential customers, to display their preferences for the new concept or product compared to their currently used favorites. The invention provides a systematic way to determine how target respondents would score a new product concept, how the idea stacks up against the respondent's two current favorites, how the execution of the concept or idea being tested performs compared to the concept itself and the two favorites, and which competitors or current behaviors they would switch away from to use the new product or service. The system processes and translates the data into a readily understandable and replicable score. The system provides both quantitative and qualitative development guidance based on scale ratings and respondents' verbatim reasons for making their comparative ratings. This gives precise guidance to product developers, management, and investors on probable trial, repeat and depth of repeat. The analysis shows the user who wants the product and why, how to improve it, who hates the product and why, and points to what needs to be done to fix the product.

The invention relates to a pure development tool built to help companies identify, create and build successful new products and fix old products. The iterative method of test and repeat allows companies to make bets and see if they pay off—long before going to market. The invention recognizes that fast, inexpensive iteration is the route to development success and that almost nothing works in first draft. The invention provides a system for a company to get the drafts behind them before commitment to production and introduction, in a more productive, effective and efficient manner.

The invention facilitates the assessment of existing products and businesses on a fast and cost-effective basis. It further facilitates product development and business investment decisions by providing a quantifiable prediction of customer acceptance of a new product.

As a product development tool, the invention addresses the issue of how to develop products and services on a rapid and cost-effective basis. As the economy recovers from the recent slowdown, companies need to replenish their R&D pipeline of new products. Because of the past reduction in development spending, there is a gap in the traditional development process that requires a rapid screening, development and implementation of new products geared to the consumer, professional and small business markets. The present invention fills this need by providing a rapid, reliable and inexpensive system for obtaining large scale consumer evaluation of new product concepts, and developing these concepts into full implementation and execution.

This invention relates to a system and method for guiding the concept screening and development for a new product or service designed for consumers, professionals or small business. After development of the refined concept, the invention guides the development of the product or service itself, including the method of operation, customer requirements, product or service performance characteristics and all elements of the marketing mix, including brochures, advertising in all media, direct mail offers, packaging, premises, etc. The invention allows a user to make better investment decisions in new business ventures by providing a quantitative method of determining customer acceptance of a product.

The invention achieves these results using a web-based survey technique using continuous metric scales, translation of the survey results into a readily understandable score, and automatic interpretation and reporting of the data and score in plain English.

This invention provides the following: a quantitative and objective way of predicting acceptance by a group of respondents of a product or service; a step-by-step way of eliciting anchored rank order data by using metric anchors; a readily understandable score based on a respondent's relative ranking of a product that reliably predicts acceptance of the product; an inexpensive way to obtain a large sample of respondents, through the web and iteration via the web, thus providing reliability and speed at a low cost; a way of improving a concept on a step-by-step basis; a way to determine, by the use of norms, when a concept is "good enough," improvable, or whether to discard the idea; a way of improving a product or service derived from a concept on a step-by-step basis; an automated way to use respondents' relative ranking of items to predict acceptance and use over time; a way to predict acceptance by customers or other respondents in a way that can be conducted manually, or on a fully or partially automated basis, in person or on a remote basis through a communications network; and a way to help customers or other respondents accurately report the relative ranking of a new product by using continuous metric scales to compare the relative ranking of dissimilar products with anchors.

One embodiment of the invention facilitates two stages of product development: development of the concept by means of a Concept Developer and development of the product by the Product Developer.

The Concept Developer assesses customers' or other respondents' reaction to the concept of the new product or service. To determine customer reaction, the system elicits rank order data from the customer. It requests the customer to rank the customer's current favorites, the new concept, and a more detailed description of the concept. Then the system asks the customer to rate the idea on a metric scale for believability, uniqueness, importance to them personally, and the probability of recommendation to friends.

In one embodiment of the invention, described in greater detail below, scoring is numerical. By way of example, it can be based on six measures, such as the following:

a) 0, 5 or 10 on percent preference for concept over current product used and next favorite product used—assigning 5 points to preference of concept over each favorite (two current products)

b) 0 or 10 on percent preference of product experience over concept c) 1 to 6 on believability d) 1 to 6 on uniqueness e) 1 to 6 on importance f) 1 to 10 on will recommend it to friends In this preferred embodiment, calculating the score involves taking a weighted average of the answers and ratings in accordance with a predetermined formula. In this embodiment, adding up the six numbers, taking the average and multiplying by 100 derives the score. Preferably, the algorithm to determine the likelihood of customer or other respondents' acceptance and trial of the new product is I=((a1+a2)+b+c+d+e+f)/6×100. Using this algorithm, a system according to the invention displays all of the relevant data and scores on one readily understandable metric scale. While one specific weighted average is described herein, those skilled in the art will appreciate that any weighted average or combination of scores could be used under the present invention.

The Product Developer assesses likely customer or other respondent reaction to the experience of the new product or service. In the product developer, the system enables the respondent to rank the current favorites, the concept, and a more detailed description of the concept. Then the system asks the respondent to rate the idea on a line scale for ease of use, perceived speed, charm or pleasantness of experience and probability of recommendation to friends.

As with the Concept Developer, scoring for the Product Developer of one embodiment preferably is numerical, and may be based, for example, on six measures:

a) 0, 5 or 10 on percent preference for concept over current product used and next favorite product used—assigning 5 points to preference of concept over each favorite (two current products)

b) 0 or 10 on percent preference of product experience over concept c) 1 to 6 on ease d) 1 to 6 on speed e) 1 to 6 on charming, pleasant f) 1 to 10 on will recommend it to friends Adding up the six numbers, taking the average and multiplying by 100 derives the score. For the Product Developer, the preferred algorithm for determining the respondent's reaction to the experience of the product compared to his own product and the likelihood of adopting the new product is I=((a1+a2)+b+c+d+e+f)/6×100.

In the preferred embodiment, the scores for both the Concept Developer and the Product Developer provide are then assessed. For example, using the algorithms noted above, scores may be ranked as follows:

| | |
|---|---|
| 200 to 300 | Forget about it |
| 301 to 400 | Not ready for prime time |
| 401 to 500 | Something here, but it needs work |
| 501 to 600 | Good concept (or other noun), works pretty well |
| 601 to 700 | Very strong idea (or other noun), great execution |
| 701 to 800 | Customers are wild about it (or Excellent) |

In exemplary embodiment of the invention, the key score is the percent of the sample scoring the concept or product over 600. In this embodiment, the percentage of customers scoring the new concept over 600 would be considered the top score using the technique according to the invention. This has a high correlation with subsequent product success in the market place.

The system generates sample thresholds or norms for product performance based on the experience of testing many similar products. The thresholds are the scores that successful products achieve. The user of the system may choose a threshold or adopt one recommended by the system for the type of product being tested.

The system is designed for multiple iterations. Iterations include testing the concept or product experience, reviewing the test results, modifying the concept or product based on the test results and repeating the tests with new survey participants. Both the concept developer and the product developer are used in iterations of the concept or product features until the user of the system achieves the desired results.

The Concept Developer is iterated until one of two events occurs: either the developer gives up, since the concept and a more detailed description of the concept cannot be improved to meet target thresholds, or having exceeded target thresholds, subsequent iterations do not improve concept performance.

The Product Developer works in a similar manner. The system asks the customer or other respondent to compare the product concept to various implementations of the product, such as on-line applications, advertisements, direct mail offerings, physical embodiments of the product, product experiences of taste, wearability, usefulness, quality, or many other examples that would be apparent to those skilled in the art. The system asks the customer to rank each component under consideration quantitatively and objectively to identify how strongly the component supports the concept. Based on the customer's ranking, the system generates an overall score and a score of how well each of the components supports the product concept. If a key component does not meet minimum thresholds, the system generates a plain English message to the user of the system. If additional strengthening, addition of elements to the product, or reduction of the price does not improve performance, the system generates important information to the developer.

The Linescale system is an effective tool for assessing advertising, packaging and other marketing components. In another embodiment of the invention referred to as an Advertising Developer, the system according to the invention is used to assess the persuasive effect of advertisements, packaging or other marketing materials. Using the same techniques as the Concept Developer and the Product Developer, the Advertiser Developer system asks the customer or other respondent to provide his current assessment of the existing or new product and the customer's two other products or relevant behaviors. For example, in testing a weight loss product, a customer would be asked to assess the weight loss product and his other methods of achieving weight loss, such as exercising, taking diet pills or reading healthy cookbooks. After providing relative rankings of the product and the customer's two favorite products or behaviors, the Advertiser Developer would display a commercial or story board to the customer. After viewing the commercial twice, the customer would be asked to re-rate his assessment of the product and identify his reasons for the rating both quantitatively and objectively. As with the Product Developer and the Concept Developer, the Advertisement Developer would generate a detailed report that would provide detailed guidance on the persuasive nature of the advertisement.

It will be appreciated that the Linescale System according to the invention is effective for assessing existing products.

Another aspect of the invention described in greater detail below is referred to herein as the Marketing Report Card. According to this aspect of the invention, the system uses the same techniques as the Concept Developer and the Product Developer to assess ongoing products. For example, in testing customer attitudes about a weight loss system, the Marketing Report Card asks customers to rate the weight loss system and the customer's two other favorite weight loss products or methods. With these competitive anchors in place, the system asks the customer to rate each of the components of a system. For example, a customer may assess aspects of a weight loss system, such as a diet center, staff, food, price, and instructional materials. After presenting the customer with a score for his ratings, the system asks the customer whether he agrees or disagrees with the assessment he has provided and the system asks the customer for quantitative and subjective reasons for the rating. The system generates a report that provides valuable feedback about what aspects of a product work and which do not in a rapid and easily understandable manner.

It will be appreciated that one aspect of the present invention that creates the reliability and stability of the data generated by the Linescale System is the way it creates the "competitive frame" or "customer space." This means that the system helps place the respondent in the right frame of mind to answer the questions in a reliable fashion. Without establishing this framework, customers may give answers that do not provide an accurate predictor of their behavior. Without the framework, respondent answers may be influenced by whim or a typical human response to novelty, order of questions, or the difficulty of identifying true preference in the abstract.

The personalized selection of favorite brands, products or practices in the market space as competitive frame is a unique stabilizing factor as well as a benchmark for evaluation. Market research today typically may use a "control" such as a given brand or product currently offered in the market place as an "anchor". Another common practice is to use an "ideal" imagined product as a control. But each of these lacks the personal commitment and clarity of understanding based on the respondent's personally selected items or practices as current favorites.

The method for establishing the framework is to ask the customer or other respondent to identify his or her current favorite activity or brand and then to identify his or her second favorite activity or brand. The system often provides the respondent with a wide array of activities and brands as choices to get the customer in the right space. Products and services may cross many markets, so it is often desirable to identify the various activities associated with the product to give the respondent the right framework.

It will be understood by those skilled in the art that the invention may be deployed in many different embodiments. The following describes preferred embodiments of the invention in reference to the accompanying drawings.

FIG. 1 is a block diagram showing a system according to one preferred embodiment of the system. While this exemplary system is web-based, it will be appreciated that other approaches may be utilized.

The system 1 includes a host computer 10 such as a server computer, a network 11, a user terminal 12 and an array of terminals, generally referred to by references 13-15. The terminals may comprise personal computers, or other types of terminals known in the art. Target respondents (typically comprising, for example, prospective or existing consumers or customers) of the subject product, use the terminals 13-15 to provide feedback about a product concept to the host computer 10. In the embodiment of the system discussed herein, a survey preferably is conducted with a minimum of 48 respondents, but other numbers of respondents could be used. Thus, it should be understood that while four terminals illustrated, a larger number will preferably be used.

As illustrated in the examples that follow, the host computer 10 transmits screens to the terminals 13-15 over the network 11. The host computer 10 also transmits reports to the user of the Linescale system at the user's terminal 12 over the network 11. The user may also use the user terminal 12 to access the host computer 10 to obtain the reports from the surveys, as described generally below.

Figure 2A:
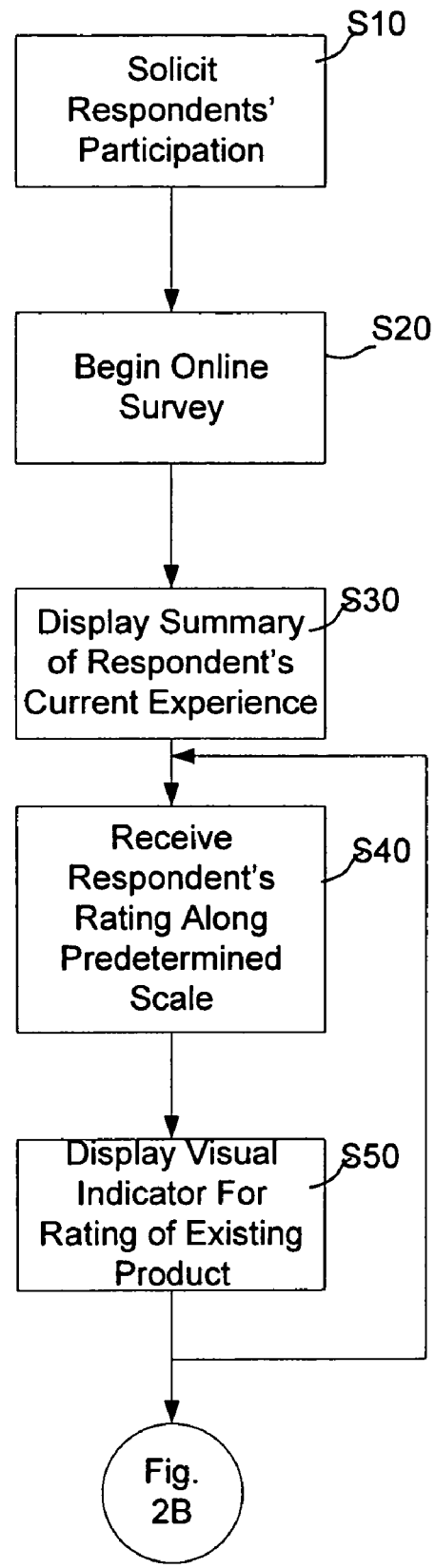
FIGS. 2A-2C are flowcharts illustrating the general function and operation of an embodiment according to the present invention.
Figure 2B:
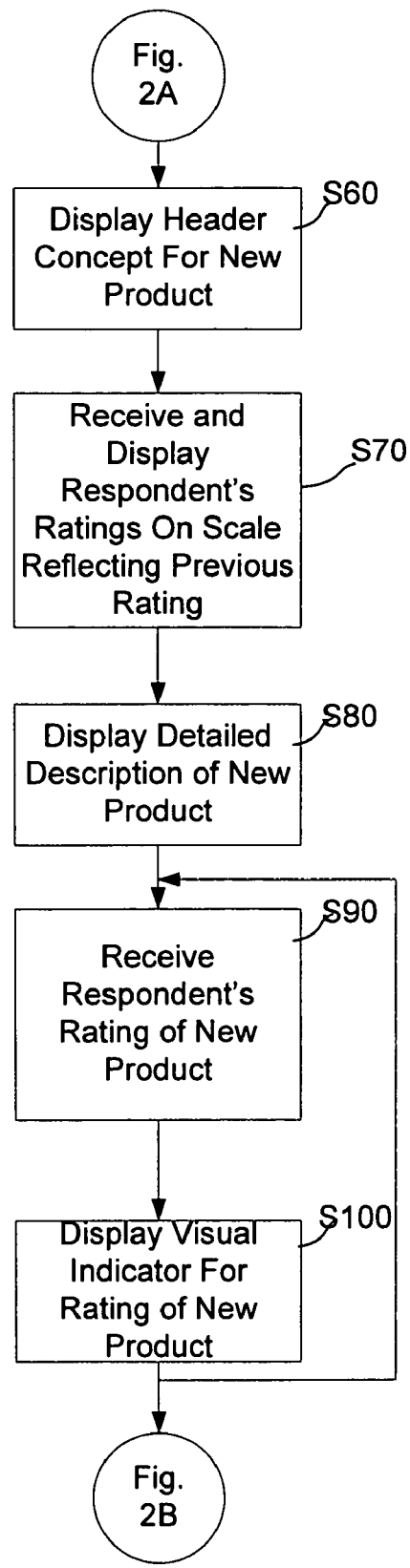
Figure 2C:
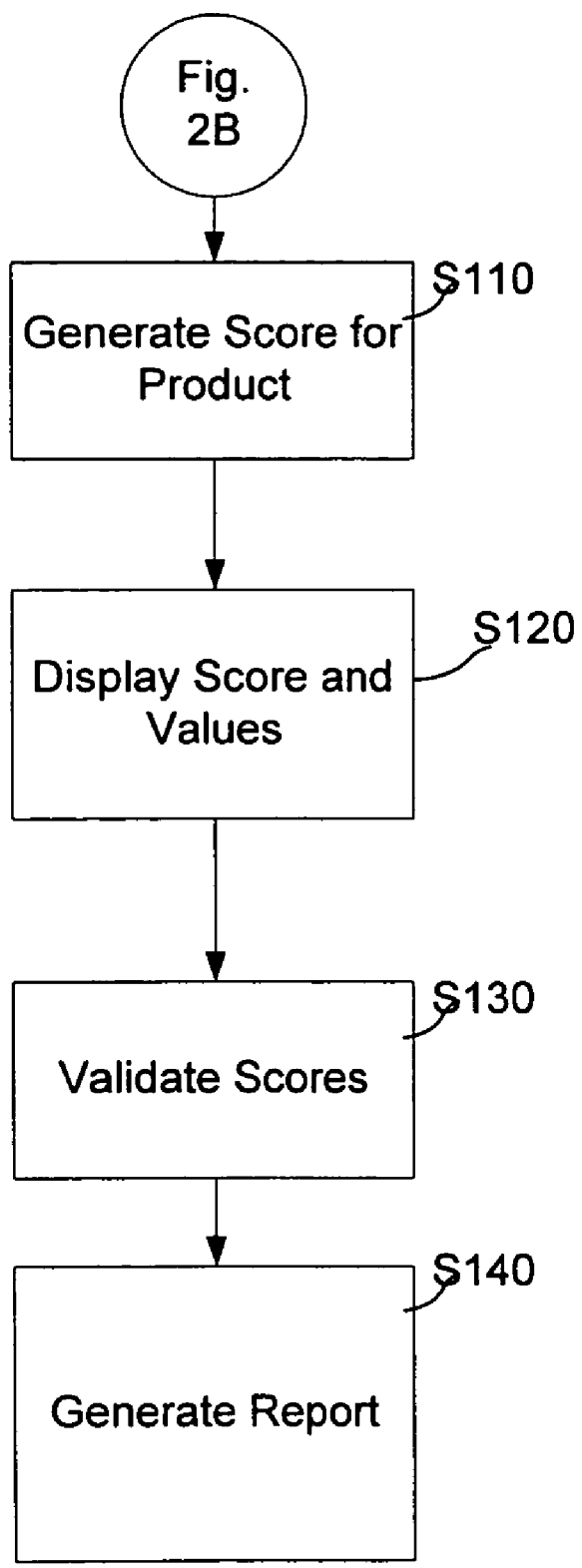

FIGS. 2A-2C are flow charts showing general features of operation of a system according to one embodiment of the invention, as described in more detail below. It will be understood that steps illustrated could be repeated; further, the steps would not necessarily be follow in the specific order illustrated.

Step S10 represents a step of contacting respondents that may comprise, for example, potential or existing customers, consumers or other targeted groups of respondents, and soliciting their participation. This may be accomplished, for example, by a letter, electronic message or other communication that includes a URL to access a system that conducts the survey. Once the respondent logs onto the system, the respondent receives and provides information that is used for concept and product development and to generate reports.

In the example shown, a respondent begins a survey at S20. Preferably, the respondent provides information about the respondent's current practices and/or preferences with respect to an existing product, which as noted above, may comprise any method, service or article of manufacture, as well as all of the features and marketing components of any method, service or article of manufacture. Based on these responses, the system displays a summary of the respondent's current experiences at S30.

The system then prompts the respondent and receives ratings for the existing product at S40. According to one feature of the invention, this is done in reference to a metric scale or "linescale." The system displays a visual indicator along the scale corresponding to the first existing product rating as represented at S50. This may be repeated for several different aspects of the existing product.

At S60 of this example, the system displays a "header concept" or general introduction of a new product. While reference is made to a new product, it will be understood that the new product could simply be different from the first product. The system receives from the respondent and displays ratings of the new product on the predetermined scale used for the existing product at S70. As generally illustrated, this is repeated for several different aspects of the new product Once the ratings of the new product are displayed, the system preferably displays a detailed description of the new product at S80. The respondent then is prompted to again rate the new product at S90 and a visual indicator of the rating of the new product is displayed at S100. Preferably, this is performed successively for various aspects of the new product.

Once the ratings are collected, at S110 the system generates a score, preferably by taking the average of the total responses and multiplying them by, for example, 100. The system then displays the score and values to the respondent at S120. Preferably, the respondent is prompted to validate the scores at S130, for example, by indicating whether the respondent agrees or disagrees with the scores. Preferably, the respondent can also provide reasons for the ratings and other comments.

According to another aspect of the invention, illustrated generally at S140, the system collects and processes the scores from several respondents to generate a report. Aspects of the report may include those described more specifically below in reference to one exemplary embodiment.

An example of one embodiment of the invention is now described in reference to a bill handling product. As generally indicated above, respondents are first contacted and requested to participate in a survey. For example, the system may generate solicitation notices to potential customers in the target market by electronic mail. For example, the message indicates that the request is for surveys used for future product ideas. Preferably, it includes an incentive for participation, such as entry in a prize drawing. Preferably, the message provides an overview of the survey, for example, indicating that it will: ask the respondent to indicate what he or she does today on a continuous metric scale; show new ideas and ask how to rate them on the same continuous metric scale; recap the rating and what it means and ask the respondent whether he/she agrees or disagrees. Preferably, included in the message is the URL for access to the survey.

Once the respondent begins the survey, the first screen asks the respondent questions related to his or her current bill payment practices. For example, it may ask: "Are you the person who pays the bills in your household?"; "About how many bills does your household pay per month?"; "How do you usually handle your bills?"; and "You sometimes also . . . ". As illustrated in FIG. 3, the respondent responds by selecting from answers provided on a drop down menu or in a text box for other responses. In the example shown in FIG. 3, the respondent has responded that he is the bill payer, he pays nine bills a month, and pays most by check, but a few electronically.

Figure 4A:
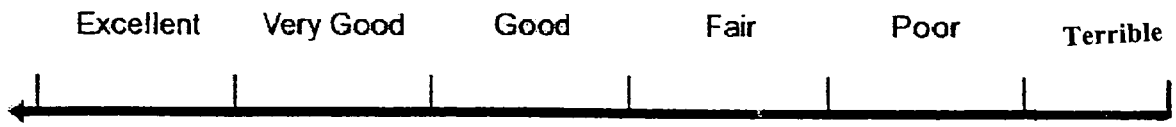
Figure 4B:
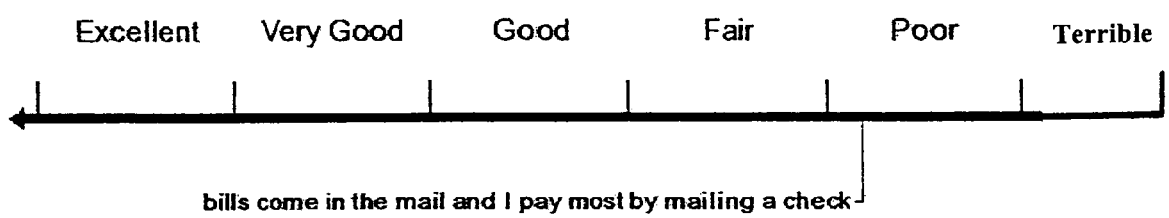
Figure 4C:
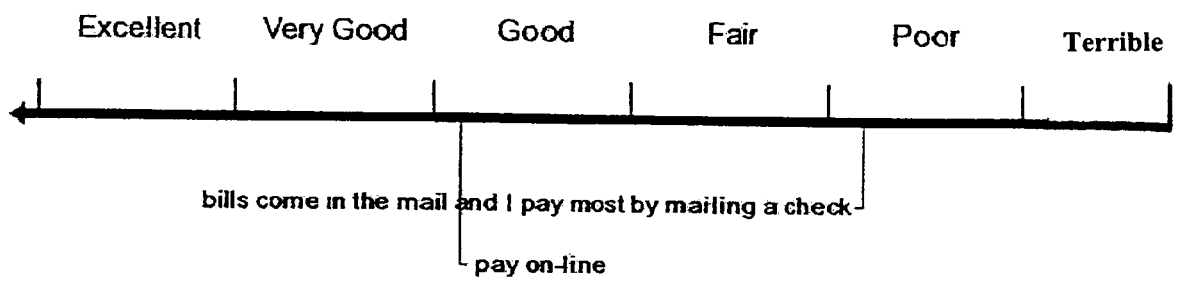

According to one feature of the invention, the system then displays a predetermined scale against which the respondent can indicate a rating for an existing product. Preferably, the scale is based on the information previously furnished by the respondent in the preceding screens (such as illustrated in FIG. 3). A series of such continuous metric scales are shown in FIGS. 4A-4C. For example, FIG. 4A, illustrates a screen which states the respondent's current practice of bills coming in the mail and paying most by check, and prompts the respondent to rate his or her experience of paying bills by check on a metric scale that runs from excellent to terrible. Typically, the respondent may indicate his or her preference using a mouse to select a point on the scale and then confirm the result. While a mouse is described above as a user input device for indicating ratings on a continuous metric scale, it would be apparent to one skilled in the art that any number of other electronic input devices could also be used in the present invention.

The system then validates what the respondent has said by marking the continuous metric scale with the respondent's response to the question of how the respondent rates his or her current bill payment experience of paying bills by check. In this example, the respondent rated the experience as "poor." On the same screen, the system asks the respondent to rate his on-line bill payment experience on the same continuous metric scale from excellent to terrible.

Next, as shown in FIG. 4C, the second rating for paying on-line is displayed simultaneously with the first rating. the system displays to the respondent both of his responses on one continuous metric scale. In this example, the respondent reported that his experience of paying on-line is good and that his experience of paying by check is poor. In addition, the system prompts the respondent to "Click here to see the concept."

The system next displays to the respondent a "headline" concept statement about the new product. An exemplary headline concept is as follows:

Secure and Organized Bill Handling

Finally, an easy way to take the drudgery out of getting your bills paid on time. With this new service you can get your utility bills, credit card bills, telephone, Internet ISP, Cable, student loan bills, insurance—even mortgage or rent—right on the web! You'll get an email as soon as any bill or invoice is ready for viewing. Then you go to your private web site located behind your bank's security firewall. Since you can set up reminders and alerts to notify you anyway you like (email, instant messenger, even a text message sent your cell phone!), you won't have to worry about missing a payment or a due date ever again. Although you can access all you relevant bills and documents in one easy place, each bill is coming directly from your biller. No one else, including your bank, can see or access the information.

You simply log on to your personalized web site and you can:
    View all the details of your bills and statements
    Pay bills electronically right from any bank account or charge them to a credit card
    Store these bills and documents online for future reference
    Print bills and statements for your paper files
    View a complete organized payment history and archive
    Share a specific bill or statement with someone else—for example, share the tuition bill with your parents This service will present and archive the following bills and statements to make your life a little more manageable.
    Utility bills (phone, electric, cable, etc.)

Figure 5:
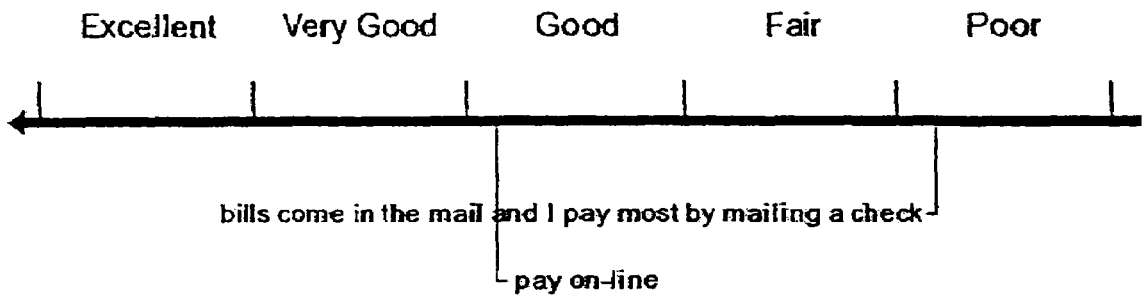

Rent or mortgage
Car Loan bills
Credit Card bills
Insurance bills
Medical bills
Tuition bills
School Housing, Meal Plan, Student Health, Bookstore bills
And practically any other bill from any business or institution After the respondent reviews the concept, a next screen (see FIG. 5) prompts the respondent to rate the concept on a continuous metric scale that reflects the respondent's previous rating of his current bill paying experience. The respondent's ratings of his current experience are called "metric anchors." This innovative feature helps get valid and replicable data from the respondent. By recording the respondent's view of the respondent's current experience, the respondent articulates his or her baseline experience on an objective basis.

Figure 6:
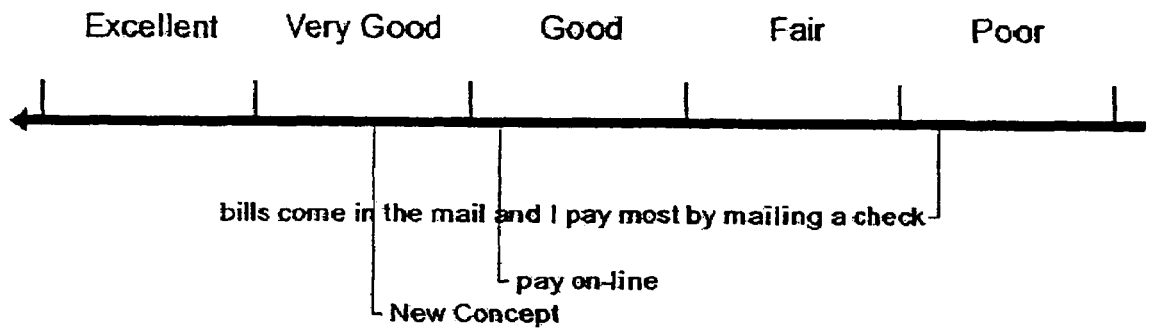

Once the respondent marks his rating, the system displays a screen that reflects the respondent's rating, as shown, for example, in FIG. 6. In this example, the respondent rated the New Concept as very good. On the same screen, the system asks the respondent to "Click here to see how it works."

Next, the respondent views a more detailed description of how the new product or concept works as shown in FIGS. 7-11. Preferably, the system describes the product in a detailed narrative, for example, as illustrated in FIG. 7. Preferably, the system subsequently displays a series of interactive screens, which provide tasks to the respondent that give the respondent a typical experience with the new product.

In this example, interactive screens relate to a bill payment system for a bank. It includes a series of actions that can be performed for a checking account, including a summary of accounts, detail of accounts, account summary, account download, stop payment, order checks, transfer funds, and pay bills. The screens include a drop down menu to select from existing accounts. The available balance is also displayed.

As shown in FIG. 8, a personalized welcome screen displays a series of new bills, including the biller, the date received and their status. The screen includes option buttons to add a biller, delete a biller, and edit preferences.

Figure 9:
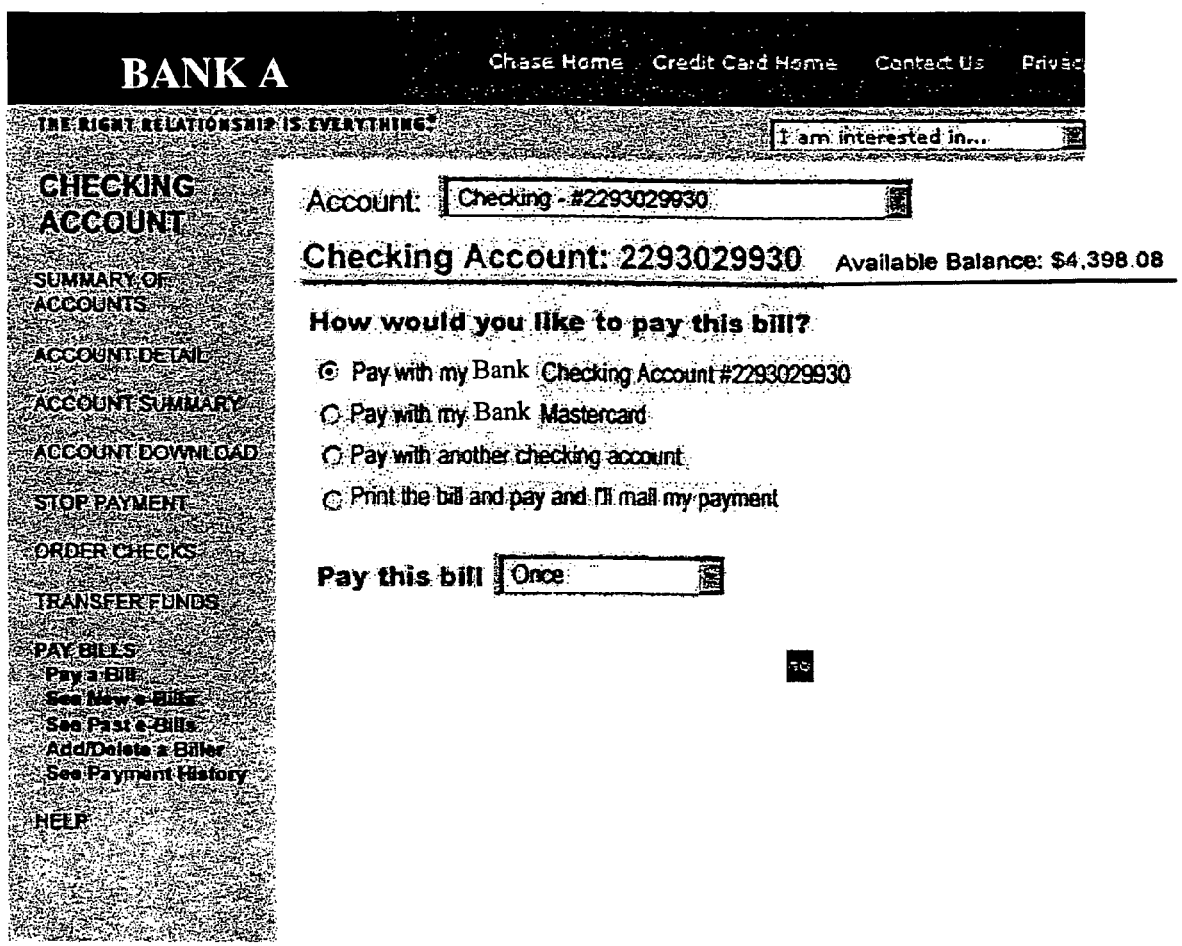
Figure 10:
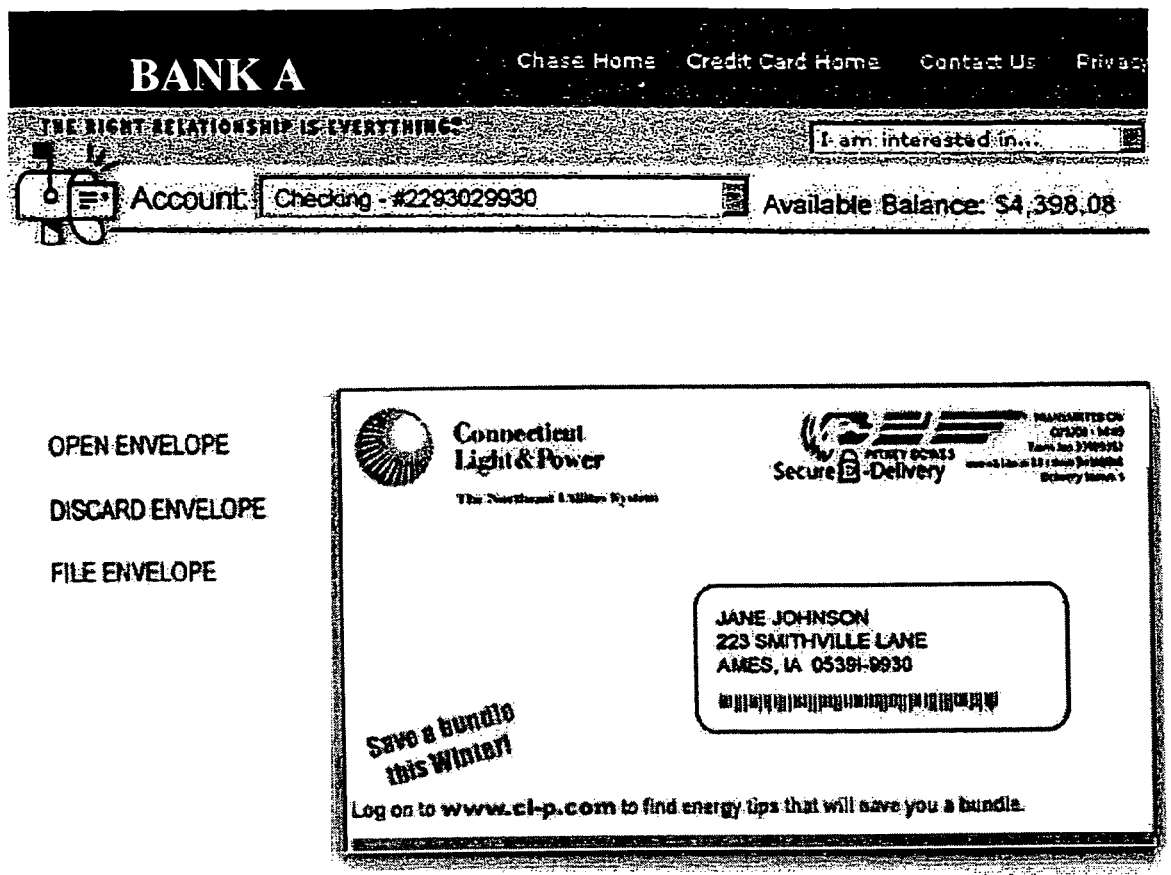

FIG. 9 illustrates a screen for selecting the method of payment. FIG. 10 illustrates a screen for viewing a bill. FIG. 11 is a partial view of an account summary page. It will be understood that the illustrated screens are simply examples of what may be displayed to permit the respondent to experience a new product.

At the end of the experience, in the example of FIG. 11, the system prompts the respondent to "Click here to continue."

Figure 12A:
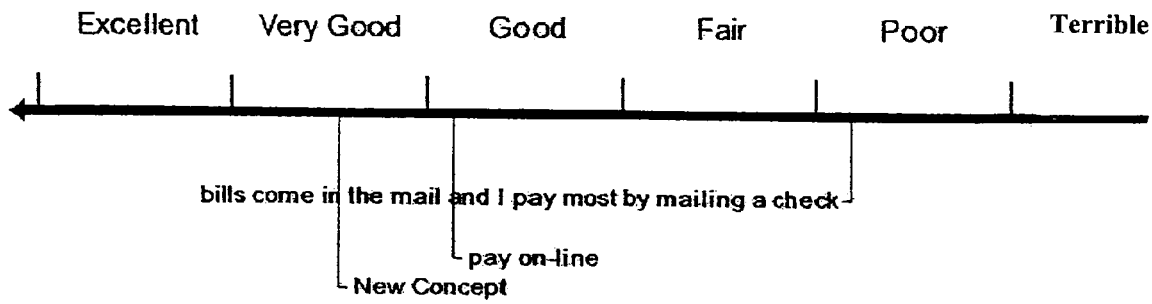

On the next screen, as shown in FIG. 12A, the system prompts the respondent, "Now that you know more about the idea, how do you rate it—higher or lower?" The screen prompts the respondent to place the respondent's rating of the more detailed understanding of the concept and the concept experience on the same scale as the respondent's rating of the concept and the respondent's two current favorites.

Figure 12B:
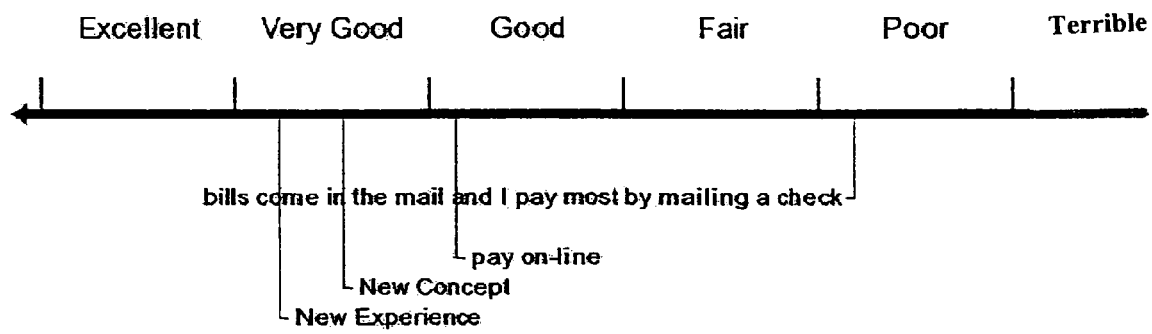

Once the respondent inputs a rating, the system, as shown in FIG. 12B, tells the respondent how the respondent rates the new concept overall. In this embodiment, the respondent rates the New Experience as Very Good and better than his rating of the New Concept and his current bill payment practices of paying on-line and paying by mailing a check. In the same screen, the system tells the respondent to "click here" for a few more questions.

The system then asks the respondent to rate the new idea on a series of continuous metric scales. For example, a series of four lines scales may be provided to allow the respondent to successively indicate: ease of use, speed, charm, and whether the respondent would recommend the new product to friends. It does this by asking the respondent to answer the following questions: "How easy or hard is it to use?", "How fast or slow is it?", "Is it charming and pleasant or ugly?", and "How likely are you to recommend it to friends?" For each answer, the system generates a score and displays the answer and the score to the respondent. The final screen showing all four answers is shown illustrated at FIG. 13. This feature ensures that the respondent understands what his answer is and the score.

Although a last screen of this sequence is shown in FIG. 13, preferably, the respondent is prompted on a step-by-step basis. For example, first the system asks, "Based on what you know so far about the idea and how it works, how would you rate it for ease of use? Click on the line from 'Easiest' to 'Terribly Hard' to tell us what you think." In this example, the respondent rates the idea as Very Easy, and the system generates a score of 41.4. The system then responds with a screen confirming the respondent rates the idea as Very Easy and tells the respondent that the score is 41.4. On this same screen, the system asks the respondent the next question, "Based on what you know so far about the idea and how it works, how would you rate it for speed? Click on the line from 'Fastest' to 'Painfully Slow' to tell us what you think." In this example, the respondent rates the speed as "Very Fast," the system generates a score of 44.4 and displays a confirmation screen depicting the respondent's rating and score. In the same screen, the system may ask the next question, "How pleasant was the idea? Click on the line from 'Charming' to 'Ugly' to tell us what you think."

In this example, the respondent rates how pleasant the idea was as "Very Pleasant." The system generates a score of 44.7 and displays a confirmation screen, which shows the respondent's rating and score. On this screen, the system asks the final question, "Would you tell your friends about the idea? Click on the line from 'Yes' to 'No way' to let us know."

In this example, the respondent marks it as, "Yes, I would absolutely tell my friends about this and ask them to try it." The system generates a score of 41.2, and displays a confirmation screen, such as FIG. 13, which shows the respondent's rating and score. It asks the respondent to "Click here to finish."

In the preferred embodiment, the system transmits respondent's responses over the network to the host computer. Once information corresponding to the respondent's responses is received by the host computer, it calculates the score by recording a number for each response on the continuous metric scale to questions about the new product concept and more detailed explanation. The system computes the score by taking the average of the total responses and multiplying by 100.

According to another feature of the invention, the system then provides the respondent a report, such as in the form shown in FIG. 14. In this example, the report indicates to the respondent that the respondent's personal rating for the concept was 750, out of a scale from 200 to 800.

Preferably, the system tells the respondent what the score means in easy to understand language. In this example, it says:

"Here are the scores and their values:

| | |
|---|---|
| 200 to 300 | Forget about it |
| 301 to 400 | Not ready for prime time |
| 401 to 500 | Something here, but it needs work |
| 501 to 600 | Good concept, works pretty well |
| 601 to 700 | Very strong idea, great execution |
| 701 to 800 | I'm wild for it |

In this example, the system asks the respondent whether he agrees with his score, and whether he would rate it higher or lower. The system then asks the customer for the reasons for his rating to be typed in a text box. Then the respondent is asked to select a number of reasons from a checkbox list of possible reasons for his rating.

As shown in FIG. 15, the respondent is then prompted to provide certain information to help assess the respondent. As illustrated, these may include demographic and relevant behavior questions, as well as questions to gauge the attitude of the respondent.

From the foregoing, it will be appreciated that the "Linescale" technique can be used advantageously to evaluate both concepts and products. It will further be appreciated that various ratings can be utilized on the scale, including descriptive ratings as well as numerical ratings. Further, different numerical values or weights may be attached to particular rating points on a scale. Preferably, the ratings are assigned a corresponding score that can be used to provide an overall evaluation. Preferably, the respondent views each continuous metric scale successively so that a respondent can provide ratings for a first, existing product or concept, and then rate a new or different product or concept against the same scale.

Another aspect of the invention is the detailed and automatic report that the system generates for the product developer or user of the system. This report is referred to herein as a product assessment report. The report preferably can be furnished using a web-based system as illustrated generally in FIG. 1, wherein the host computer 10 of the system transmits the report to the terminal 12 of the product developer or user of the system over the network 11. Preferably, the host computer may also notify the user by email that the report is ready, and the user accesses the report from the host computer over the network. Other implementations for delivery of the report will, of course, be apparent to those skilled in the art.

Preferably, data is reported automatically in a decision rule-driven reporting format. Preferably, reporting is real time. As each respondent answers, his responses are added to the database, and new calculations are automatically generated. There are both individual concept and product reports, and an aggregate "Scorecard" which displays a number of concepts or products and their scores.

An example of such a report is shown in FIGS. 16-30. In this report, the system automatically does the following: summarizes the new product concept that was shown to the target customers or other respondents who took the survey (see FIGS. 16 and 17); reports the scores in the correct tables, and the reasons for the score, (see FIGS. 16-30, wherein scores are referred to as "I-CAT scores), and generates table headings and table heading narratives in plain English acknowledging sample size, preferences, percentages, scores, etc., based on decision rules.

As illustrated, the system interprets the data and analysis and reports this interpretation in plain English, based on decision rules. For example, if the preference for the experience over the concept is higher than a predetermined percentage, the analysis states, "The product delivers on the promise." Examples of other automatically generated messages, based on predetermined percentages include, by way of example, "The product supports the concept, but needs improvement," or "The product does not deliver on the promise."

The system also creates a unique scorecard generator, which allows for the custom creation of a scorecard with comparisons to scores of any selected concepts or products. It further allows the user to change descriptive names of the selected concepts for confidentiality or other purposes. The system allows or denies linkage to the individual report supporting the score. The system provides the data in rank order determined by the top score. The system highlights key information, such as the Score Segments and reports the size of the market segment among which the test was conducted. The system also allows the user to edit the reports.

With this report, the product developer has the information needed to decide whether to modify the product, keep it as is, or discard it.

As noted above, embodiments within the scope of the present invention include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A computer-implemented method of conducting product assessment and development, said method implemented by executing instructions stored on at least one computer-readable medium, and comprising:

prompting a respondent at a data entry terminal to identify a first existing product;
   prompting said respondent to rate said first product on a predetermined scale displayed at said terminal;
   providing information to the respondent that describes a second product different from said first product;
   causing to display a visual indicator along said scale corresponding to said respondent's rating of said first product;
   prompting said respondent to rate said second product on said scale displayed at said terminal along with said respondent's rating of said first product;
   displaying a visual indicator along said scale corresponding to said respondent's rating of said second product;
   providing said respondent with additional information about said second product via said terminal;
   prompting said respondent to rate said second product on said scale, wherein said respondent's rating of said second product represents a re-rating of said second product by the respondent in view of the additional information about said second product;
   displaying a visual indicator along said scale corresponding to said respondent's rating of said second product; and
   assigning a score reflecting the respondent's rating of said second product made by said respondent, wherein the respective steps of prompting, providing, causing, prompting, displaying, providing, prompting, displaying and assigning are performed with one or more computers.

2. A computer-implemented method of conducting product assessment and development according to claim 1, further comprising:
   prompting said respondent to identify another existing product;
   prompting said respondent to rate the other existing product against said scale; and
   displaying a visual indicator along said scale corresponding to said respondent's rating of said other existing product.

3. A computer-implemented method of conducting product assessment and development according to claim 1, further comprising prompting said respondent to respond to at least one of a plurality of questions regarding said second product.

4. A computer-implemented method of conducting product assessment and development according to claim 3, further comprising collecting responses and ratings made by said respondent, calculating an overall respondent rating for said second product and displaying said rating to the respondent via the terminal.

5. A computer-implemented method of conducting product assessment and development according to claim 4, wherein said step of calculating includes calculating a weighted average of said answers and ratings in accordance with a predetermined formula.

6. A computer-implemented method of conducting product assessment and development according to claim 5, wherein after said step of displaying said rating to the respondent, said method further comprising receiving an indication from said terminal whether the overall respondent rating should be revised.

7. A computer-implemented method of conducting product assessment and development according to claim 3, wherein said respondent is prompted to respond to at least one of said plurality of questions by selecting a corresponding location on the scales.

8. A computer-implemented method of conducting product assessment and development according to claim 4, wherein said overall respondent rating for said second product is displayed to the respondent in a format indicating a numeric score and a corresponding textual description.

9. A computer-implemented method of conducting product assessment and development according to claim 1, wherein said respondent is prompted to provide ratings by selecting a corresponding area on a graphical display with a user input device electrically connected to said terminal.

10. A computer-implemented method of conducting product assessment and development according to claim 1, wherein said scale is displayed to the respondent with demarcations defining a plurality of subjective ratings.

11. A computer-implemented method of conducting assessment and development of a product using information from a plurality of potential customers, said method comprising:
   collecting scores obtained from ratings made by a plurality of respondents using the method of claim 1; and
   generating a product assessment report for said second product.

12. A program product for conducting product assessment and development, said program product comprising machine-readable program code for causing, when executed, one or more machines to perform the following operations:
   prompting a respondent at a data entry terminal to identify a first existing product;
   prompting said respondent to rate said first product on a predetermined scale displayed at said terminal;
   providing information to the respondent that describes a second product different from said first product;
   causing to display a visual indicator along said scale corresponding to said respondent's rating of said first product;
   prompting said respondent to rate said second product on said scale displayed at said terminal along with said respondent's rating of said first product;
   displaying a visual indicator along said scale corresponding to said respondent's rating of said second product;
   providing said respondent with additional information about said second product via said terminal;
   prompting said respondent to rate said second product on said scale, wherein said respondent's rating of said second product represents a re-rating of said second product by the respondent in view of the additional information about said second product;
   displaying a visual indicator along said scale corresponding to said respondent's rating of said second product; and
   assigning a score reflecting the respondent's rating of said second product made by said respondent, wherein the respective steps of prompting, providing, causing, prompting, displaying, providing, prompting, displaying and assigning are performed with one or more computers.

13. A program product for conducting product assessment and development according to claim 12, wherein said operations further comprise:
   prompting said respondent to identify another existing product;
   prompting said respondent to rate the other existing product against said scale; and
   displaying a visual indicator along said scale corresponding to said respondent's rating of said other existing product.

14. A program product for conducting product assessment and development according to claim 12, wherein said operations further comprise prompting said respondent to respond to at least one of a plurality of questions regarding said second product.

15. A program product for conducting product assessment and development according to claim 14, wherein said operations further comprise collecting responses and ratings made by said respondent, calculating an overall respondent rating for said second product and displaying said rating to the respondent via the terminal.

16. A program product for conducting product assessment and development according to claim 15, wherein said operation of calculating includes calculating a weighted average of said answers and ratings in accordance with a predetermined formula.

17. A program product for conducting product assessment and development according to claim 16, wherein after displaying said rating to the respondent, said operations further comprise receiving an indication from said terminal whether the overall respondent rating should be revised.

18. A program product for conducting product assessment and development according to claim 14, wherein said respondent is prompted to respond to at least one of said plurality of questions by selecting a corresponding location on the scale.

19. A program product for conducting product assessment and development according to claim 15, wherein said overall respondent rating for said second product is displayed to the respondent in a format indicating a numeric score and a corresponding textual description.

20. A program product for conducting product assessment and development according to claim 12, wherein said respondent is prompted to provide ratings by selecting a corresponding area on a graphical display with a user input device electrically connected to said terminal.

21. A program product for conducting product assessment and development according to claim 12, wherein said scale is displayed to the respondent with demarcations defining a plurality of subjective ratings.

22. A program product for conducting product assessment and development according to claim 12, wherein said operations further comprise generating a product assessment report for said second product.

23. A system for conducting product assessment and development, said system including a server communicatively coupled to a network to which at least one terminal is coupled, said server being configured to:
   prompt a respondent at a data entry terminal to identify a first existing product;
   prompt said respondent to rate said first product on a predetermined scale displayed at said terminal;
   provide information to the respondent that describes a second product different from said first product;
   cause to display a visual indicator along said scale corresponding to said respondent's rating of said first product;
   prompt said respondent to rate said second product on said scale displayed at said terminal along with said respondent's rating of said first product;
   display a visual indicator along said scale corresponding to said respondent's rating of said second product;
   provide said respondent with additional information about said second product via said terminal;
   prompt said respondent to rate said second product on said scale, wherein said respondent's rating of said second product represents a re-rating of said second product by the respondent in view of the additional information about said second product;
   display a visual indicator along said scale corresponding to said respondent's rating of said second product; and
   assign a score reflecting the respondent's rating of said second product made by said respondent, wherein the respective configurations to prompt, provide, cause, prompt, display, provide, prompt, display and assign are performed with one or more computers.

24. A system according to claim 23, wherein said server is further configured to:
   prompt said respondent to identify another existing product; and prompt said respondent to rate the other existing product against said scale; and display at said terminal a visual indicator along said scale corresponding to said respondent's rating of said other existing product.

25. A system according to claim 23, wherein said server is further configured to prompt said respondent to respond to at least one of a plurality of questions regarding said second product.

26. A system according to claim 25, wherein said server is further configured to collect responses and ratings made by said respondent, calculate an overall respondent rating for said second product and display said rating to the respondent via the terminal.

27. A system according to claim 26, wherein said server is configured to calculate a weighted average of said answers and ratings in accordance with a predetermined formula.

28. A system according to claim 26, wherein after said displaying said rating to the respondent, said server is configured to receive an indication from said terminal whether the overall respondent rating should be revised.

29. A system according to claim 25, wherein said respondent is prompted to respond to at least one of said plurality of questions by selecting a corresponding location on the scale.

30. A system according to claim 26, wherein said overall respondent rating for said second product is displayed to the respondent in a format indicating a numeric score and a corresponding textual description.

31. A system according to claim 23, wherein said respondent is prompted to provide ratings by selecting a corresponding area on a graphical display with a user input device electrically connected to said terminal.

32. A system according to claim 23, wherein said scale is displayed to the respondent with demarcations defining a plurality of subjective ratings.

33. A system according to claim 23, wherein said server is further configured to generate a product assessment report for said second product.

* * * * *

UNITED STATES PATENT AND TRADEMARK OFFICE
CERTIFICATE OF CORRECTION

| | | |
|---|---|---|
| PATENT NO. | : 7,664,670 B1 | Page 1 of 1 |
| APPLICATION NO. | : 10/823584 | |
| DATED | : February 16, 2010 | |
| INVENTOR(S) | : Lawrence D. Weiss | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1476 days.

Signed and Sealed this

Thirtieth Day of November, 2010

David J. Kappos
*Director of the United States Patent and Trademark Office*